United States Patent [19]
Sherwood et al.

[11] Patent Number: 6,098,006
[45] Date of Patent: Aug. 1, 2000

[54] MODULAR LOCOMOTIVE BRAKE CONTROLLER

[75] Inventors: Dale L. Sherwood, Ft. Worth, Tex.; John J. Allen, Watertown, N.Y.; Brett A. Pierce, Arden, N.C.; Kevin B. Root, Black River, N.Y.; Richard E. Sinn, Watertown, N.Y.; Eric C. Wright, Evans Mills, N.Y.

[73] Assignee: New York Air Brake Corporation, Watertown, N.Y.

[21] Appl. No.: 09/254,638

[22] PCT Filed: Sep. 12, 1997

[86] PCT No.: PCT/US97/13697

§ 371 Date: Nov. 23, 1999

§ 102(e) Date: Nov. 23, 1999

[87] PCT Pub. No.: WO98/10967

PCT Pub. Date: Mar. 19, 1998

Related U.S. Application Data

[60] Provisional application No. 60/026,039, Sep. 13, 1996.

[51] Int. Cl.[7] ........................................... B60T 13/68
[52] U.S. Cl. .............................. 701/70; 701/19; 303/128; 246/82 B
[58] Field of Search ................................... 701/19, 70, 78, 701/32, 33, 35; 303/128, 135, 22.6; 246/182 B

[56] References Cited

U.S. PATENT DOCUMENTS

| | | |
|---|---|---|
| 4,041,470 | 8/1977 | Slane et al. . |
| 5,083,274 | 1/1992 | Bezos et al. . |
| 5,172,316 | 12/1992 | Root et al. . |
| 5,185,700 | 2/1993 | Bezos et al. . |
| 5,590,042 | 12/1996 | Allen, Jr. et al. . |

Primary Examiner—Michael J. Zanelli
Attorney, Agent, or Firm—Barnes & Thornburg

[57] ABSTRACT

A modular locomotive brake control unit according to the present invention includes a manifold having mounted thereon at least two of a brake pipe module, a brake cylinder module, a brake signal module, equalization reservoir module, independent brake module, and an actuating module. Each of the modules includes a module controller in a network with a unit controller and an electric brake valve. The modules and brake valve controllers include an identification and software identification which is monitored by the unit controller. The module controllers also include an event log. The unit controller provides commands and software to an receives data from the module controllers.

59 Claims, 22 Drawing Sheets

PRIOR ART
FIG.3

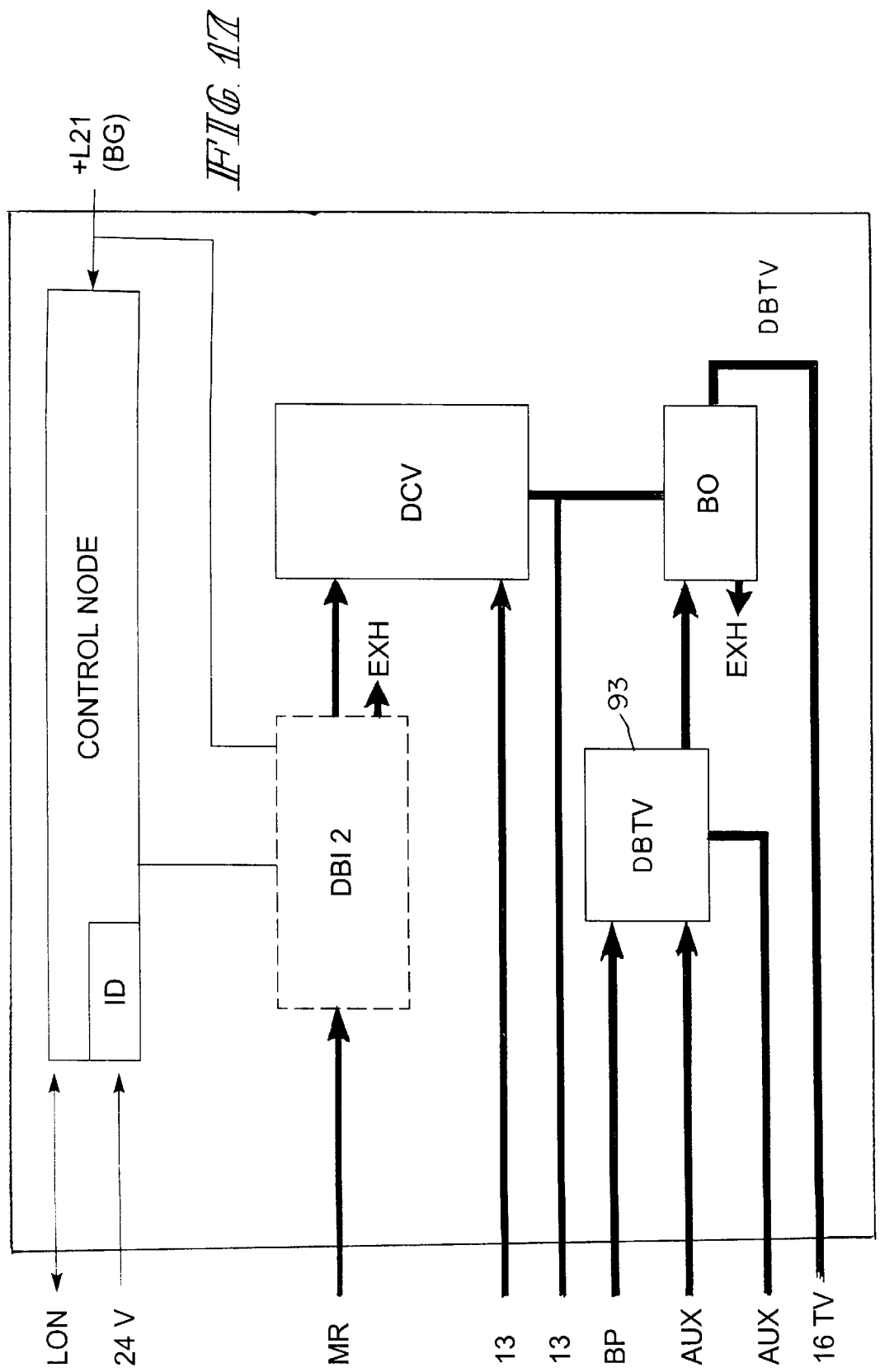

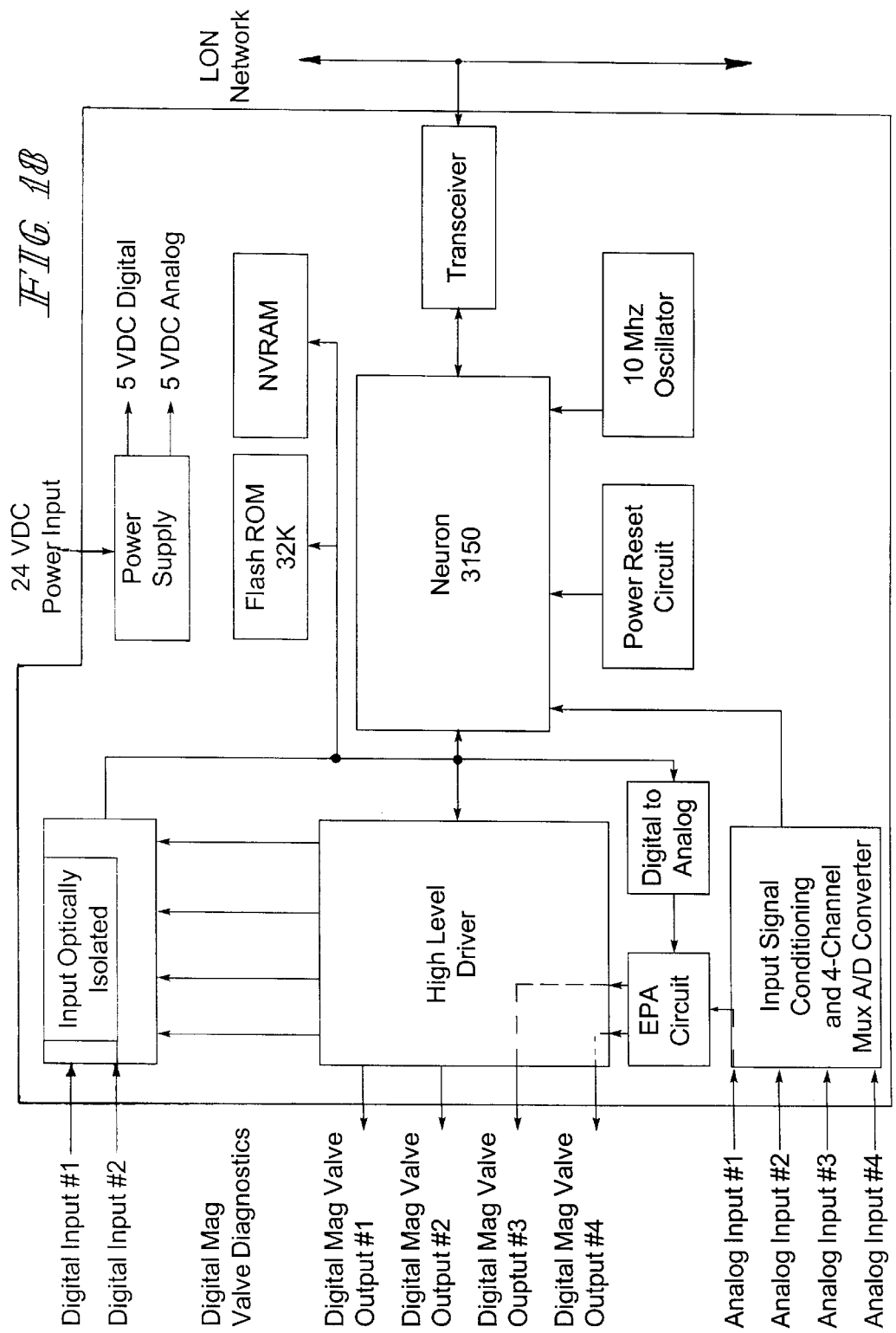

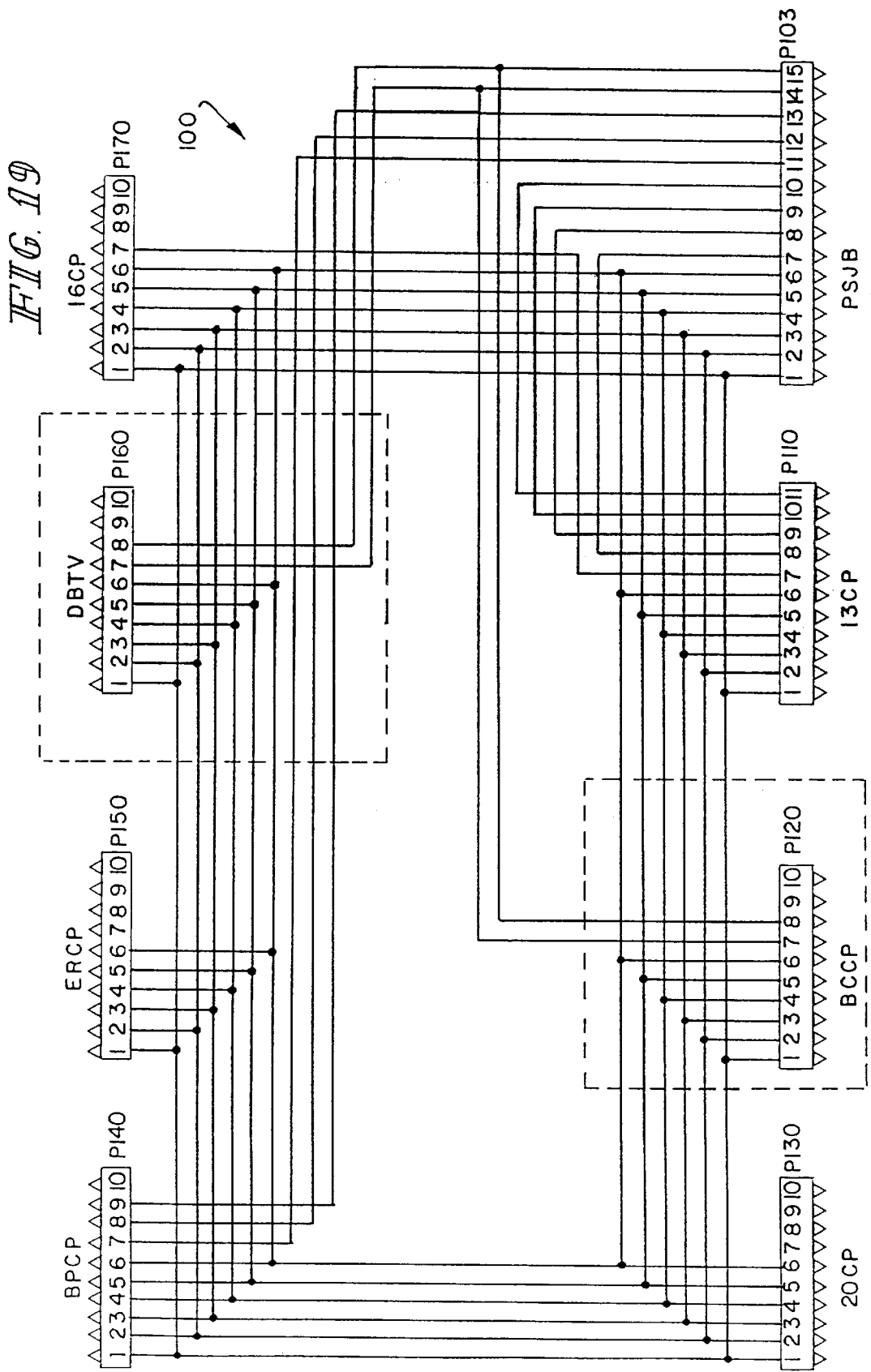

MODULAR LOCOMOTIVE BRAKE CONTROLLER

This application is a 371 of PCT/US97/13697 filed Sep. 12, 1997 which claims benefit to U.S. provisional application Ser. No. 60/026039 filed Sep. 13, 1996.

BACKGROUND AND SUMMARY OF THE INVENTION

The present invention relates generally to computer controlled railroad locomotive brake equipment and more specifically to a modular computer controlled locomotive brake controller.

The availability of computer controlled railroad brake equipment includes the CCB equipment available from New York Air Brake Corporation. The CCB locomotive brake control equipment is described in U.S. Pat. No. 5,172,316 and is illustrated in FIG. 1 and 2. The numbers used throughout this application correspond to that used in this patent for sake of clarity and consistency. With computerized and electric control, the operation of the locomotive and the train must be safe for failure of any electrically controlled portion.

With the addition of electropneumatic braking and other electric subsections, there has been a proliferation of new onboard locomotive subsystems. This has resulted in a squeeze of real estate available in the locomotive. Since the interconnection of these various subsystems have been added one by one, it has increased the complexity of their interconnection and their weight. For example, the complexity of the brake control portion or pneumatic control unit 62 of the CCB is illustrated in FIG. 3. The manifold is complex and wiring must be connected to each of the individual electrical valves and transducers. There are thirty-four line replaceable units mounted to this manifold. Since the locomotive cannot carry thirty-four of the individual components, the whole locomotive must be taken into a shop for repair.

The complete brake control portion 62 can be removed and a new one inserted. This takes a substantial amount of time because of the number of wires and interconnections for the electrical components. The brake control portion 62 would then have to be tested and the individual parts replaced. Also, the brake control portion 62 is not adaptable to adding new functions nor to removing existing functions as the design requirements change in future locomotives. With increased sophistication within the locomotive, there is also a need for locomotive integration to allow communication and control between the various systems and subsystems.

A modular locomotive brake control unit would include a manifold having connected thereto a brake pipe module, brake cylinder module, an electropneumatic equalization reservoir module, an electromagnetic independent brake module, each controlling pressure at a corresponding port. Also, mounted to the module is an electropneumatic brake signal module providing a pneumatic brake signal to the brake cylinder module. At least the electropneumatic modules include electropneumatic and pneumatic elements and a modular controller.

The module controllers include a common structure of a processor, plural analog input ports, plural digital input ports and plural digital output ports. The processor includes a closed loop pressure controller receiving inputs from the processor and one of the analog inputs and providing a digital output. The common structure includes a transceiver connected to a network with the other transceivers of the other modules.

The modules include a storage having an identification data therein and evented data. A junction box on the manifold connects the electropneumatic modules to an external source of electric signals. At least one pressure transducer is provided on each electropneumatic module. Two brake pipe pressure transducers are provided in separate modules as are two supply pressure transducers. The brake pipe module may also include at least one electropneumatic valve and a modular controller. An electropneumatic actuating module may also be provided on the manifold for controlling pressure at the actuating port and including electropneumatic and pneumatic elements and a module controller. The brake pipe module includes at least one electropneumatic and a modular controller.

A modular locomotive brake control unit according to the present invention could also include a manifold having mounted thereon at least two of a brake pipe module, a brake cylinder module, a brake signal module, and an equalization reservoir module, an independent brake module and an actuating module. It also includes a storage having an identification data therein on each of the modules. A unit controller receives the identification data from each of the modules. A module controller in each of the modules connects the storage to the unit controller. The modules also store event data and an operating program with program identification data. The unit controller receives the program identification data from and transfers operating programs to the modular controllers.

The modules include a pressure transducer and transmit the pressure values to the unit controller. The modules also include electropneumatic devices and provides the device status to the unit controller. The unit controller sends device override commands to the modular controller. The electropneumatic devices control pressure at the module to a target pressure in response to a brake handle position signal received by the modular controller. The unit controller sends target override pressures to the modular controller to override the handle responsive target pressures. The unit controller also sends modular override command signals, operating mode commands and calibration data to the modular controllers. The modular controller includes an event log and stores data therein during an event or upon prediction of an event.

A modular locomotive brake control unit according to the present invention includes a manifold having mounted thereon at least two of a brake pipe module, a brake cylinder module, a brake signal module, equalization reservoir module, independent brake module, and an actuating module. Each of the modules include a module controller, and an electropneumatic device. A unit controller is connected to each of the module controllers. The unit controller sends calibration data to the module controller. The device on the modules control pressure to a target pressure. The unit controller sends target pressures to the control modules. The control devices at the modules control pressure in response to brake handle positions and the unit controller sends target override pressures to override the handle response of target pressures. Each of the modules include a pressure transducer and the unit controller receives pressure values from the module controllers. The module controllers can also send pressure values to other module controllers.

A modular locomotive control unit according to the present invention includes a manifold having at least two of a brake pipe module, a brake cylinder module, a brake signal module, equalization reservoir module, independent brake module, and an actuating module. Each of the modules include a module controller. A unit controller provides interface with locomotive units and a brake handle controller is also provided. A communication network is created interconnecting the modular controllers, the unit controller and the brake handle controller. A junction box is provided on the manifold. The module controllers are connected in the communication network with the unit and brake handle controllers through the junction box. The controllers are connected as nodes in a LonWorks communication network. The communication network includes electropneumatic brake controllers on the individual cars in the train. The module controllers and the brake handle controller each include an identification data processed by the unit controller. The module controllers also store event data which is provided to the unit controller. The module controllers and the brake handle controller also store an operating program and program identification which is provided to the unit controller. The unit controller can transfer operating programs to the module and brake handle controllers. The unit controller also transmits clock value signals to the clocks on the module controllers.

A modular locomotive brake control unit according to the present invention includes a manifold having at least two of a brake pipe module, a brake cylinder module, a brake signal module, equalization reservoir module, independent brake module, and an actuating module. A module controller is provided on each of the modules and includes an event log and data stored therein. The module controller stores data therein upon determining an event or upon predicting an event. The module controller sends an event signal to the unit controller upon event determination. The unit controller periodically sends a clock value signal to the clocks on each of the modular controllers.

A modular locomotive brake control unit according to the present invention includes a manifold having at least two at of a brake pipe module, a brake cylinder module, a brake signal module, equalization reservoir module, independent brake module, and an actuating module. Each of the modules include a module controller having an operating mode and an electrical device having a status. A unit controller is connected to each of the module controllers for controlling the mode of the modules and overriding the status of the devices. The module controllers ignore device overrides when in a normal mode and obey device overrides in a test mode. The module controller stores an operating program, executing the operating in the normal mode and not in the test mode. The module controllers obey device overrides and execute the operating program in a monitor mode. The modular controller has a normal mode and a test mode and is in the normal mode in absence of the test mode command from the unit controller. The unit controller has the ability to transfer any operating programs to the modular controllers.

Other objects, advantages and novel features of the present invention will become apparent from the following detailed description of the invention when considered in conjunction with the accompanying drawings.

BRIEF DESCRIPTION OF THE DRAWINGS

FIG. 3 is a plan view of the brake control portion of the system of FIG. 1 of the prior art CCB.

FIG. 17 is a block diagram of the triple valve control portion according to the principles of the present invention.

FIG. 18 is a block diagram of the control node of the electropneumatic control unit according to the principles of the present invention.

FIG. 19 is a schematic of the wiring harness for the electropneumatic control unit according to the principles of the present invention.

DETAILED DESCRIPTION OF THE DRAWINGS

Figure 1:
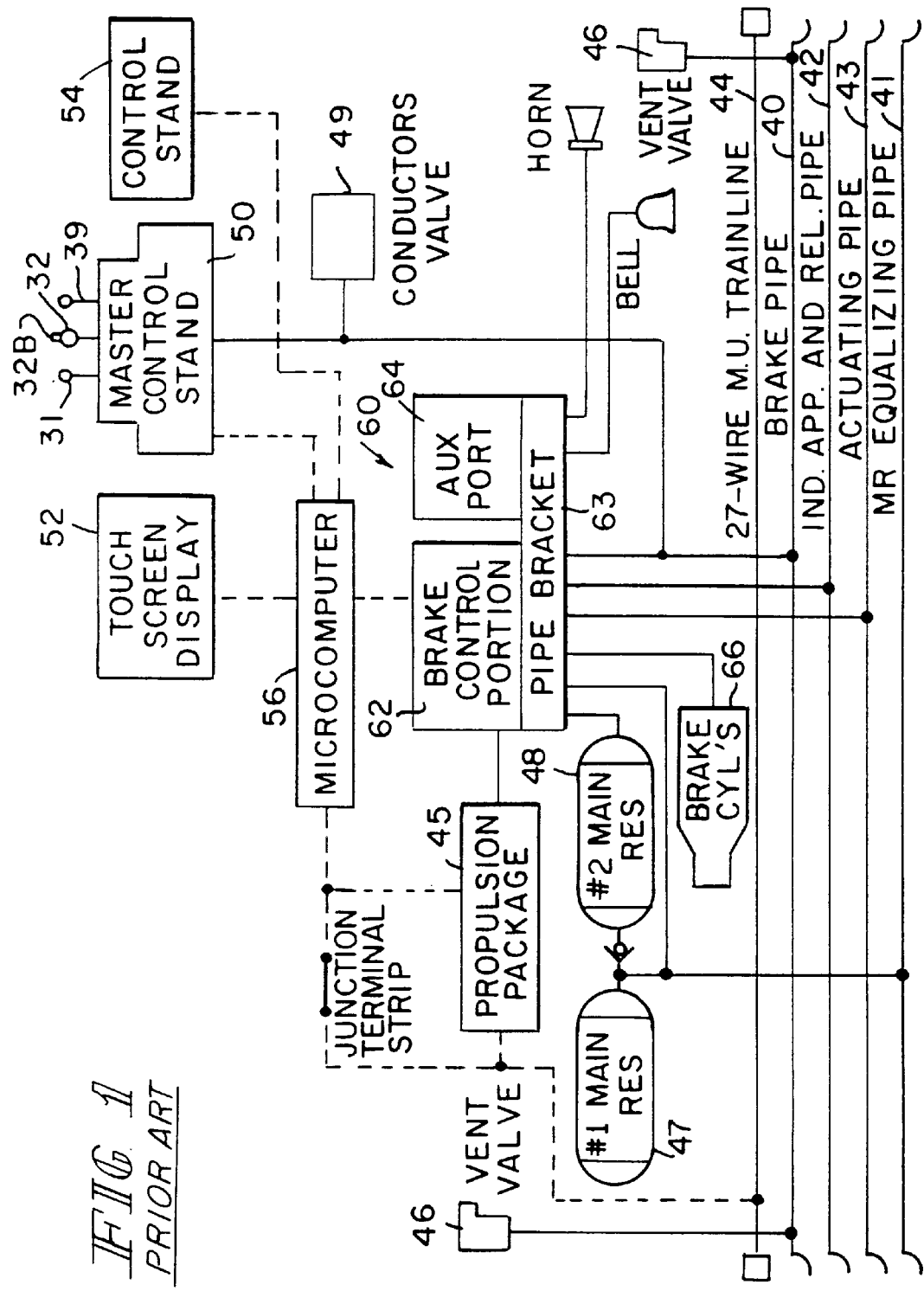
FIG. 1 is a schematic representation of a locomotive control system of the prior art.

A computerized locomotive control system of the prior art is illustrated in FIG. 1. It should be noted that in the Figures the fluid lines of the pneumatic system will be illustrated by solid (FIGS. 1, 2) or thick (FIGS. 6, 8, 10–17) lines whereas the electrical interconnections will be illustrated by dash (FIGS. 1, 2) or thin (FIGS. 6, 8, 10–17) lines. Wherever possible, the elements in the Figures will have the same numbers as those of the prior art described in FIGS. 1 and 2. All modifications will have a reference number in the hundreds. A master control stand 50 includes the automatic brake handle 31, the independent brake handle 32 and the throttle 39. The locomotive includes the brake pipe 40, the main reservoir equalization pipe 41, the independent application and release pipe 42 (#20 pipe), actuating pipe 43 (#13 pipe), and a 27-wire multiple unit electrical trainline 44. The standard pair of vent valves 46 are provided on the brake pipe 42.

The master control stand 50 is fluidly connected to the brake pipe 40 so as to directly apply an emergency condition fluidly to the brake pipe. A conductor valve 49 is also connected to the brake pipe 40 to apply an emergency condition. The master control stand 50 is electrically connected to the microcomputer 56 as are touch screen display 52 and an auxiliary control stand 54. Microcomputer 56 is connected to the propulsion package 45, which is a standard prior art propulsion package, and both are connected to the 27-wire trainline 44 for electrically communicating with the other locomotives on the train.

An electropneumatic interface control valve 60 between the microcomputer 56 and the pneumatic braking system is shown as including the brake control portion 62 and an auxiliary portion 64 both connected to pipe bracket 63. Interface control valve 60 provides all the functions of the control of the brakes, both pneumatically and electrical signalling, and for auxiliary controls. The pipe bracket 63 is a connection of all pipe interfaces which provides a unitized valve for simplification of maintenance. The pipe bracket 63 has the required reservoir for brake operations and contains disposable filters for the pneumatic inputs.

The brake control portions 62 provides for all braking portions found on the locomotive. This controls the brake pipe 40, the brake cylinder 66 of the locomotive, independent brake pipe 42 and actuating pipe 43. It provides all the required electrical interfaces for the operation of the brake system. The auxiliary portion 64 provides pneumatic controls for the special functions. This may be for the sanding, pneumatic horns, bells, etc. Auxiliary portion 64 operates independent of the brake valve.

A first main reservoir 47 is connected to the main reservoir equalization pipe 41 as is a second main reservoir 48. The second main reservoir 48 is connected to the electromagnetic interface control valve 60.

The system of FIG. 1 is a simplification of the controls by consolidating the numerous engineer control devices in a central location. Controls have been consolidated into a three handle master controller unit 50 and a touch screen display 52. All of the normal train operation will be obtainable through these two devices. A fuel pump, engine run, headlights, auxiliary lights and heater controls are not incorporated into the microcomputer 56 since they would not simplify the operation. These functions are in the auxiliary control stand 54. Other than the master control stand 50 and the brake pipe 40 providing an emergency brake application directly to the brake pipe 40, the master control stand 50 is connected to the pneumatic part of the brake system through the microcomputer 56.

The automatic brake handle 31 provides signals to the microcomputer 56 to the level of command brake or special commands. The independent brake handle 32, which provides independent control over the locomotive brake versus the train brake of the automatic brake handle 31, also provides signals to the microcomputer 56 proportional to handles extreme positions. The independent brake handle 32 includes a button 32b which actuates a momentary switch. The pressing of button 32b is a command to pressurize the actuating pipe 43. Release of the button will vent the actuating pipe 43. This provides the "bail-off" feature of the automatic brake and if the button is continuously depressed, "bailoff" of an emergency brake. Alternatively, the independent brake handle 32 could itself be physically depressed to effectuate this function mechanically and pneumatically. The throttle 39 is a control for the 27-wire trainline 44 for power and dynamic braking.

Figure 2:
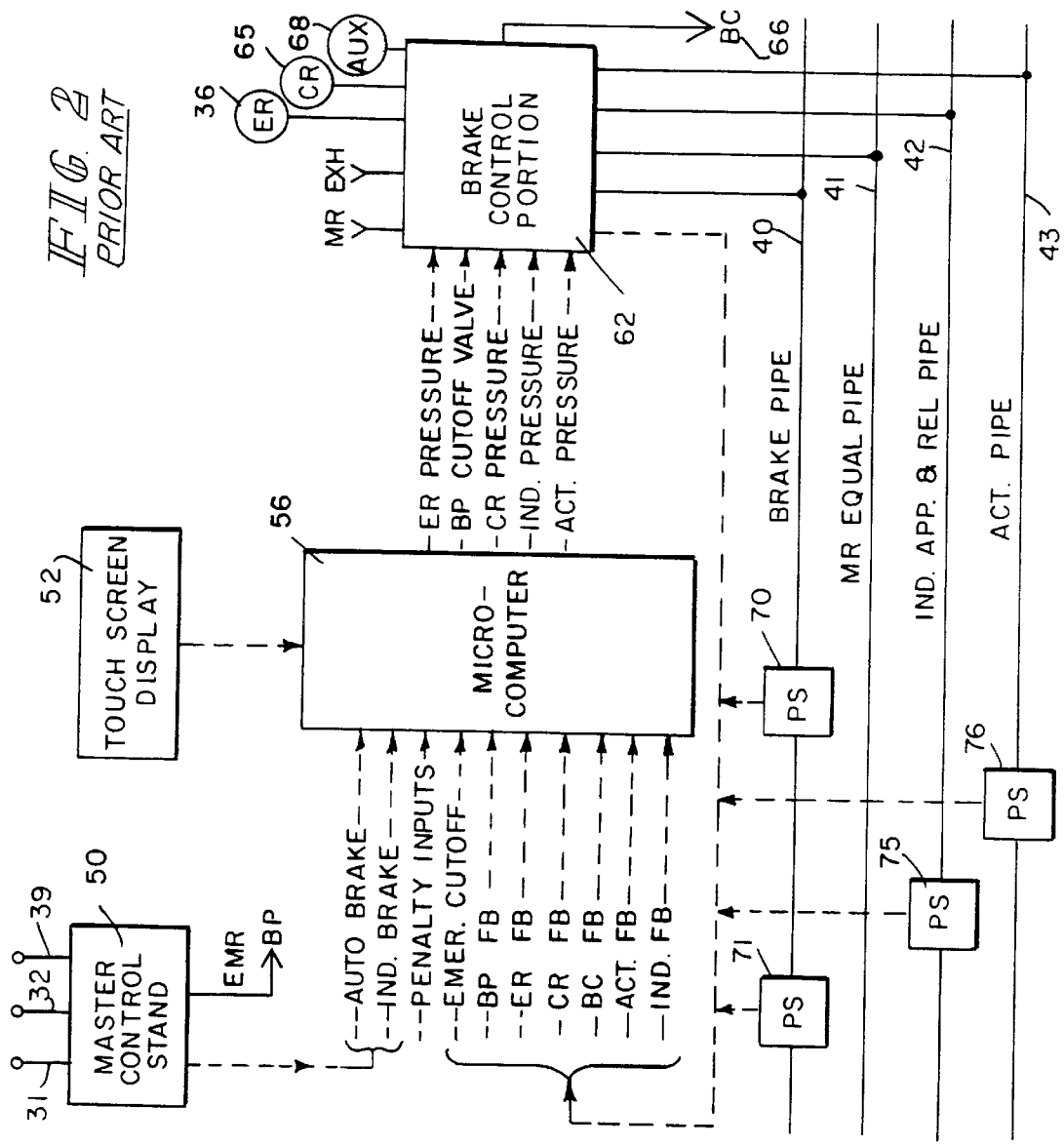
FIG. 2 is a block diagram of a computer controlled railroad locomotive brake equipment of the prior art.

An overview of the brake control portion 62 of the interface control valve 60 will be described with respect to FIG. 2. The brake control portion 62 is connected to main reservoir MR, the main reservoir equalization pipe 41, and exhaust EXH as well as the equalization reservoir 36, the control reservoir 65, and the auxiliary reservoir 68 pneumatically. It also provides a pneumatic output to the brake cylinder BC, 66, the brake pipe 40, the independent application and release pipe 42 and the actuating pipe 43.

Brake control portion 62 receives electrical control signals for the equalization reservoir pressure, brake pipe cutoff valve, the control reservoir pressure, the independent application and release pipe pressure and the actuating pipe pressure from the microcomputer 56. Inputs to the microcomputer 56 includes the automatic brake and independent brake electrical signals from the master control stand 50, penalty inputs from standard penalty devices as electrical signals as well as a group of electrical feedback signals. These feedback signals from pressure sensors in FIGS. 2 and 3 include brake pipe pressure 70, emergency cutoff pressure 71, equalization reservoir pressure 72, control reservoir pressure 74, brake cylinder pressure 73, actuating pipe pressure 76, and independent application and release pipe pressure 75, main reservoir flow 77 and main reservoir pipe pressure 78.

Figure 3:
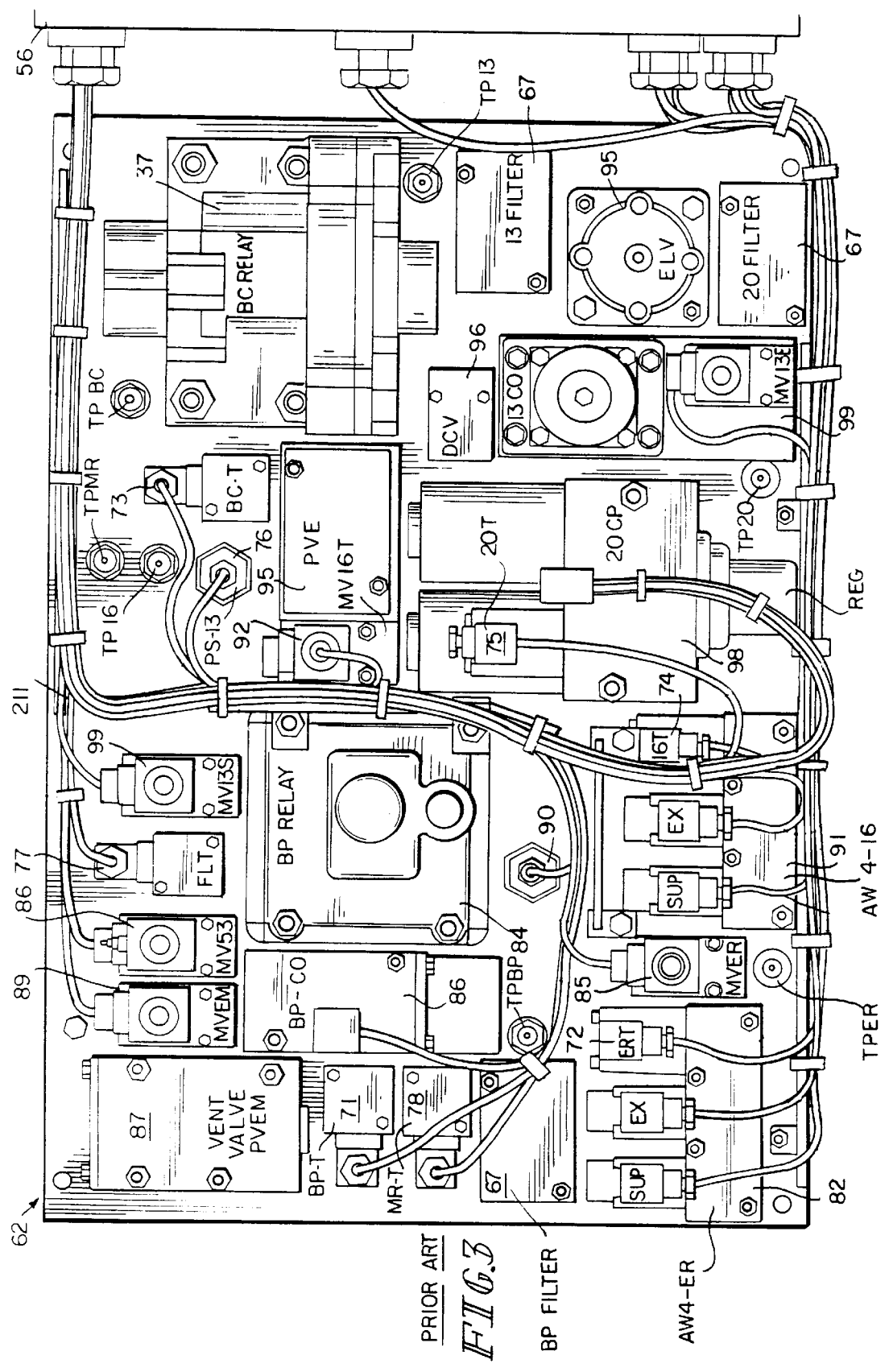

The elements in the layout of the pneumatic control unit or brake control portion 62 mounted to a manifold or pipe bracket 63 is illustrated in FIG. 3. The numbers used are those in the previously mentioned U.S. Pat. No. 5,172,316. The unit includes brake pipe, 13 pipe and 20 pipe filter 67. Brake pipe transducer 71, brake cylinder transducer 73, main reservoir transducer 78 and reservoir flow transducer 77 are mounted directly to the manifold. A pressure switch PS-BP for an emergency pressure sensor 70 for the brake pipe is also provided on the manifold. The pressure sensing port PS-13 for the 13 pipe pressure switch 76 is also shown directly on the manifold. The equalization reservoir transducer 72, brake signal or 16 port transducer 74 and independent or 20 pipe transducer 75 are mounted to their pressure controllers 82, 91 and 98 respectively.

The actuator or 13 pipe controller 99 is also mounted to the manifold and includes a 13 cut-off valve 13 CO, a 13 magnetic exhaust valve MV13E and a separately mounted supply magnetic valve MV13S. A magnetic valve MVER 83 connecting the equalization reservoir controller 82 to equalization reservoir is mounted on the manifold directly as are brake pipe relay 84 and brake pipe cut-off 86. The brake pipe cut-off 86 includes a piloted pneumatic section BP-CO and its electropneumatic portion MV53. A piloted vent valve PVEM 87 is mounted to the pipe bracket to vent the brake pipe and is controlled by an electropneumatic valve MVEM 89. The output of the control reservoir pressure control 91 is connected through tow cut-out valve MV16T 92. The emergency valve PVE 95 and double check valve DCV 96 are also mounted on the manifold. The output of the double check valve 96 controls the brake cylinder relay 37 also mounted to the manifold. Test points TP are provided throughout the manifold.

It should be noted that the triple valve 93 response to the brake pipe is not shown since in the CCB it is not mounted on the manifold with the other elements. A review of FIG. 3 indicates that there are a substantial number thirty-four line removable elements mounted to the manifold. All of the elements related to one particular function are not mounted in a single module, and thus cannot be removed as a single module for replacement, repair or elimination of that function. Similarly, different line removable elements are mounted by different fasteners and nuts and therefore a multitude of tools are needed in order to service the pneumatic control unit.

Figure 4:
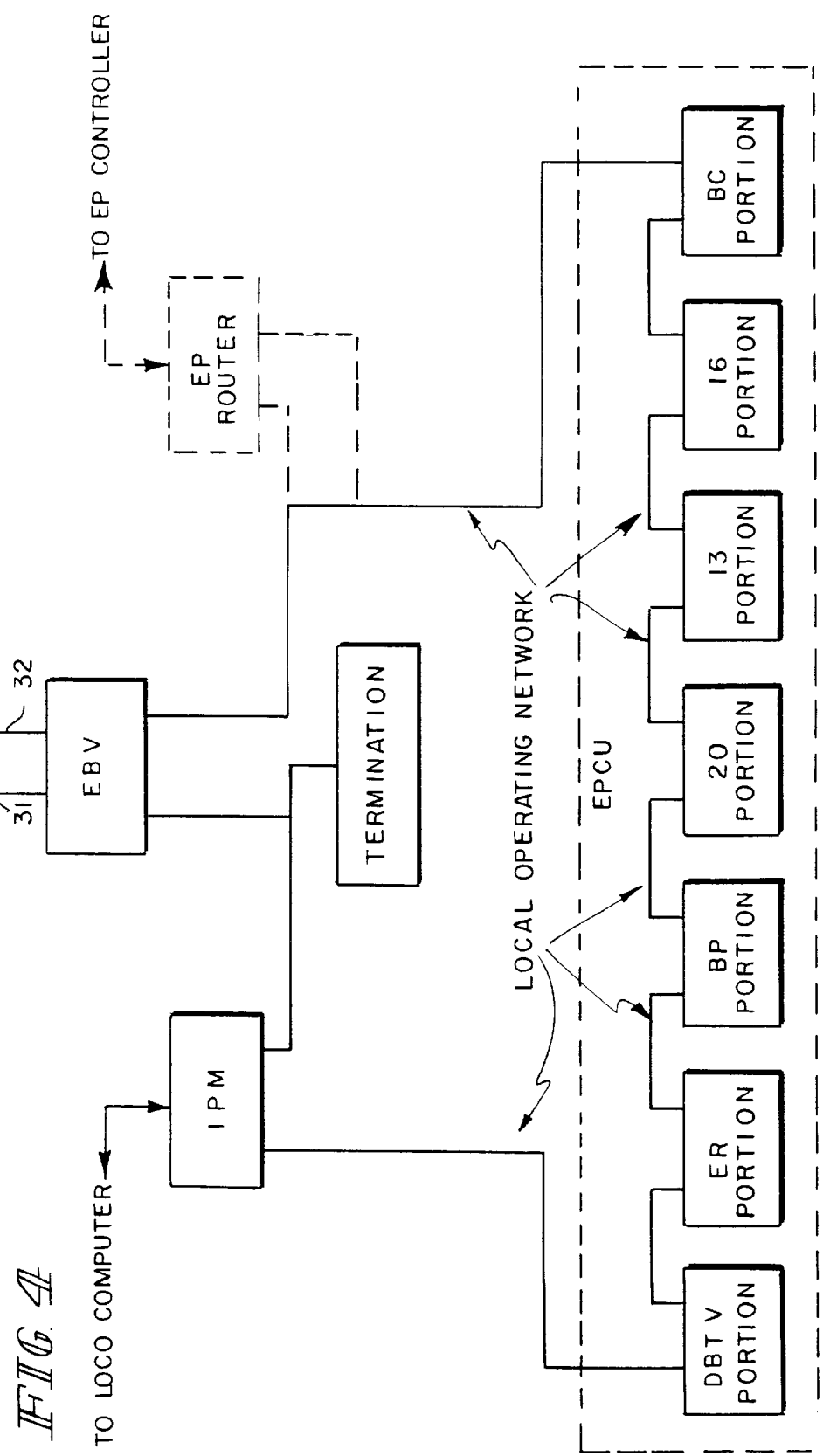
FIG. 4 is a schematic representation of a locomotive control unit according to the principles of the present invention.

An overview of the locomotive brake control unit according to the present invention is illustrated in FIG. 4. The system includes electronic brake valve EBV which serves as the input portion through the human-machine interface. The electronic brake valve EBV includes the automatic brake handle 31 and an independent brake handle 32 with a bail-off switch. An easy to read digital display provides instantaneous information on the equalization reservoir target pressure. This avoids the feedback delay inherent in other systems and allows the locomotive engineers to excise precise braking control. As a failsafe feature, the electric brake valve EBV operates a direct acting emergency venting of the brake pipe. It also includes a configurable display.

An integrated processor module IPM is the host computer for distributed power in an electronic air brake system. The IPM manages the electrical interfaces between the brake system, the locomotive and the train. It communicates with integrated locomotive and interfaces electrical trainlines. The IPM can communicate with a portable testing unit for running system diagnostic tests and trouble shooting. It also has the ability to handle and/or include distributed power with the appropriate hardware and software upgrades. The IPM provides high level brake control logic, locomotive system integration communication or interfacing. It should be noted that a preferred distributor system is LOCOTROL Distributed Power Control available from GE-Harris. It includes the display, for example, pressure and remote sessions, set up capability (lead/trail), penalties and diagnostic file log.

An electropneumatic control unit EPCU manages the pneumatic interface between the brake system, the locomotive and the train. It controls the locomotive brake cylinders, brake pipe, independent application and release pipe and the actuating pipe. The electropneumatic control unit includes those portions of the system which relate to the individual, pipes. Each of the portions includes electronics and pneumatics which combined into an integral line replaceable units for modules. Each line replaceable unit reflects basic operational entity within the system, can be ready-track replaced in twenty minutes using a single wrench and be light enough to be moved by a single person. The electronics of each of the line replaceable units are potted, are a standard configuration and are independent of each other. As can be seen from FIG. 4, the electropneumatic control unit EPCU includes only seven replaceable units as compared to the thirty-four of FIG. 3 of the prior art.

By providing modular portions in the EPCU, improves serviceability and decreases down time of the locomotive. It also allows upgrading a specific portion of the electropneumatic brake control by replacing all portions of that function simultaneously. It also allows elimination of a particular portion as the need and later designs of locomotive and train systems are changed. It also allows substantially easier redesign for customer demands as well as upgrades the future designs. Similarly, by providing the line replaceable units with all the pneumatic electronic and electropneumatic elements on the same block, simplifies the design of the manifold since the interconnection of the elements on the modules are in the line replaceable units.

The different portions of the locomotive control unit are interconnected by an Echelon LonWorks Network. This not only interconnects the modules of the EPU, but also connects the EPU to the IPM, EBV and the EP router. The system also has the capability of communicating with electropneumatic controls to each of the individual cars through the EP router. Since the American Association of Railroads, AAR, has selected a standard for electropneumatic car brakes incorporating the Echelon LonWorks communication protocol, ease of communication is reduced. This reduces the number of protocols throughout the train system. The intercommunication of the line replaceable units also allows communication between the line replaceable units or modules and allows a backup or redundancy of one unit for another.

The ultimate design of the locomotive brake central unit or system of the present invention occupies only 13,670 cubic inches. This is substantially smaller than the prior art previously discussed as occupying 14,000 and 28,000 cubic inches.

Figure 5A:
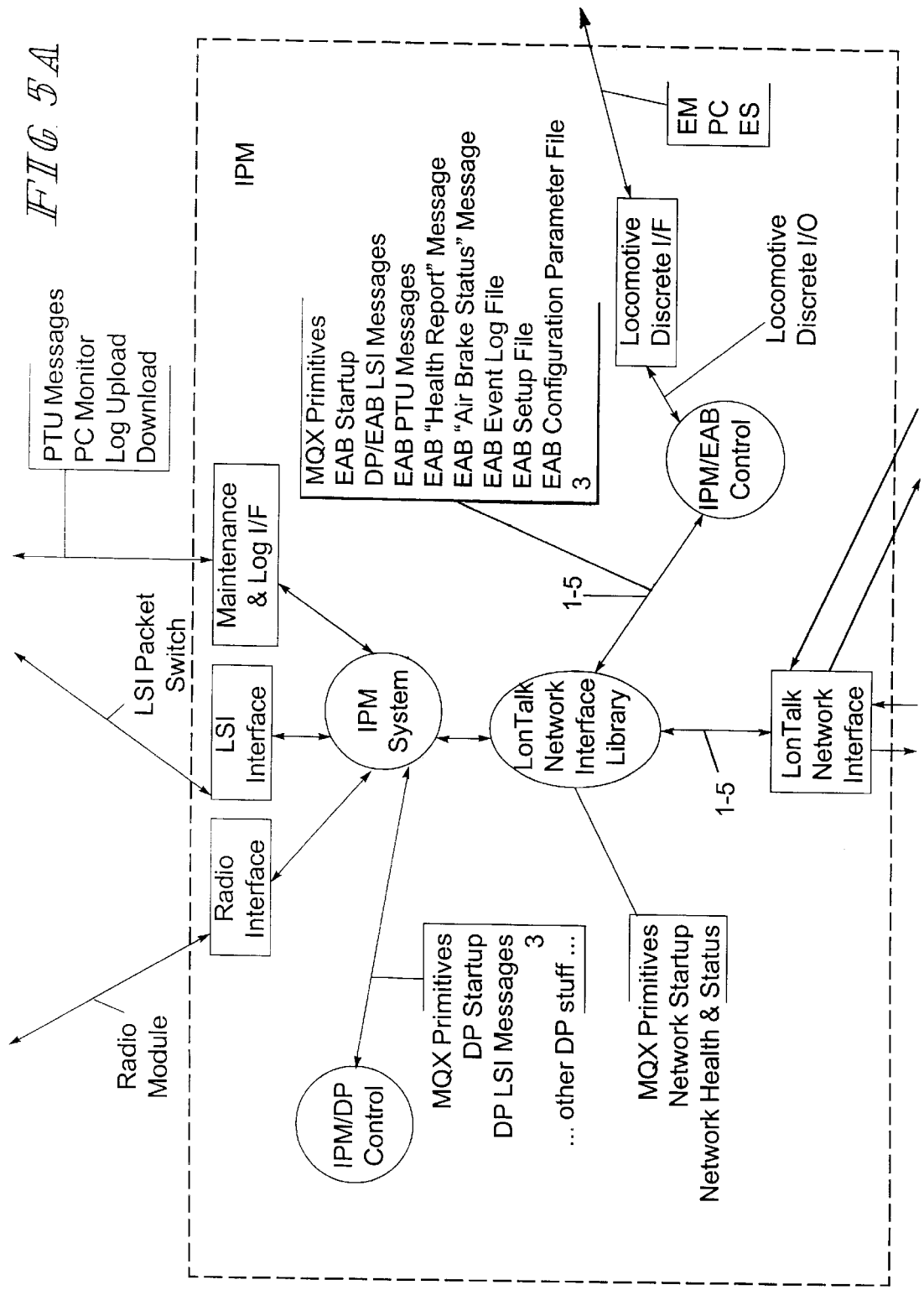
FIGS. 5A and 5B are a data flow diagram of the locomotive control unit of FIG. 4.
Figure 5B:
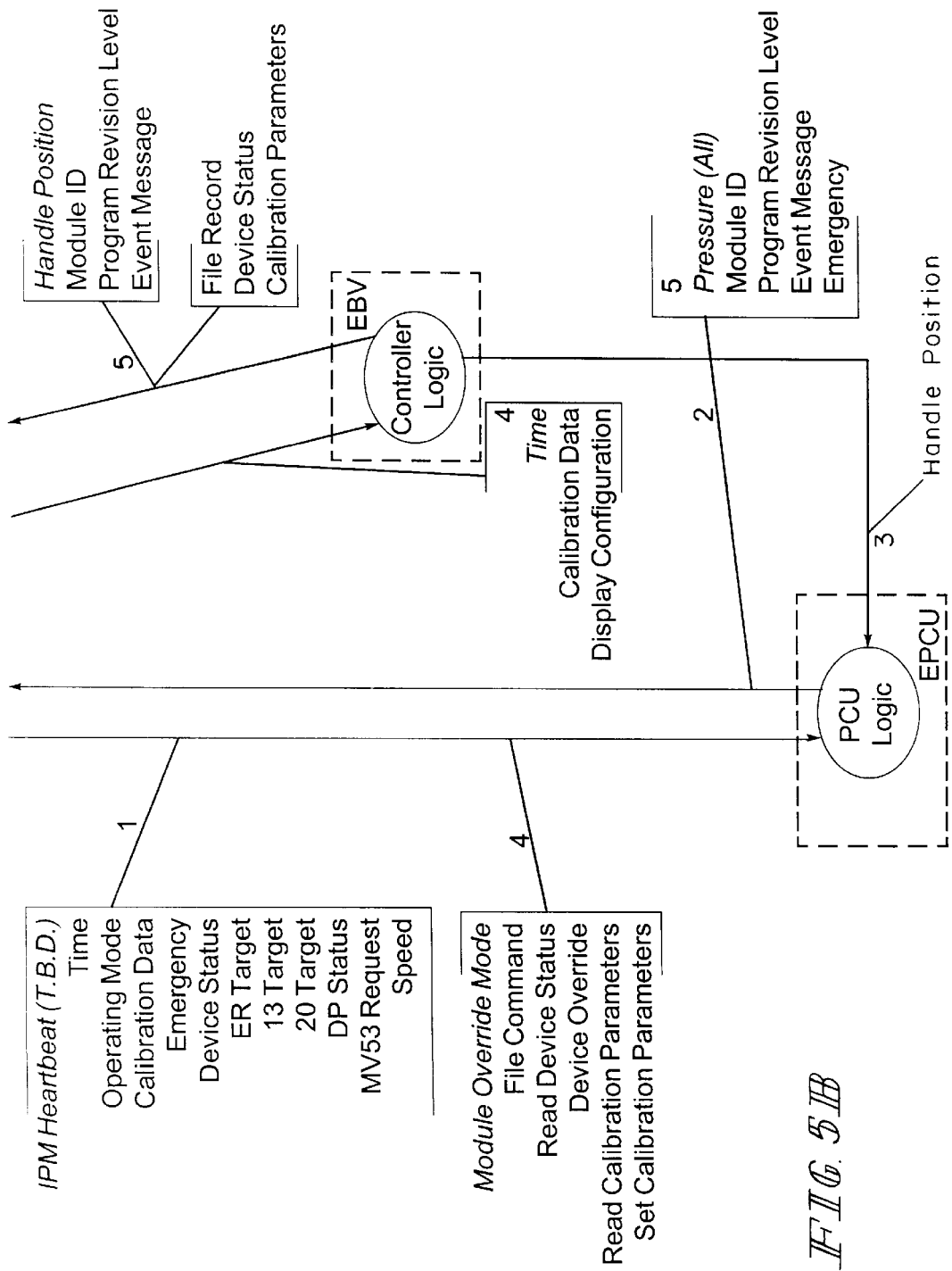
Figure 6A:
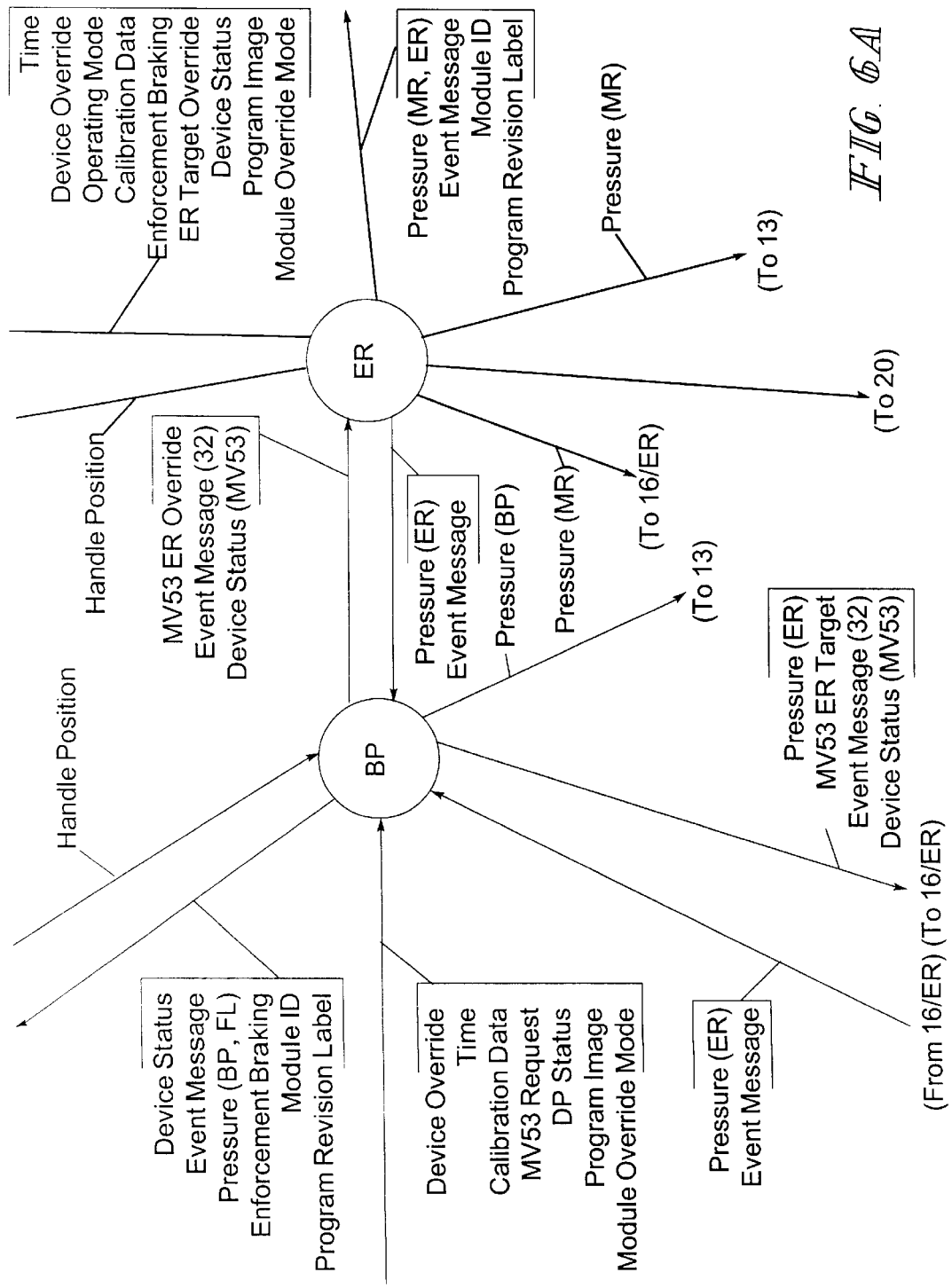
FIGS. 6A, 6B and 6C are a data flow diagram for the electropneumatic control unit according to the principles of the present invention.
Figure 6B:
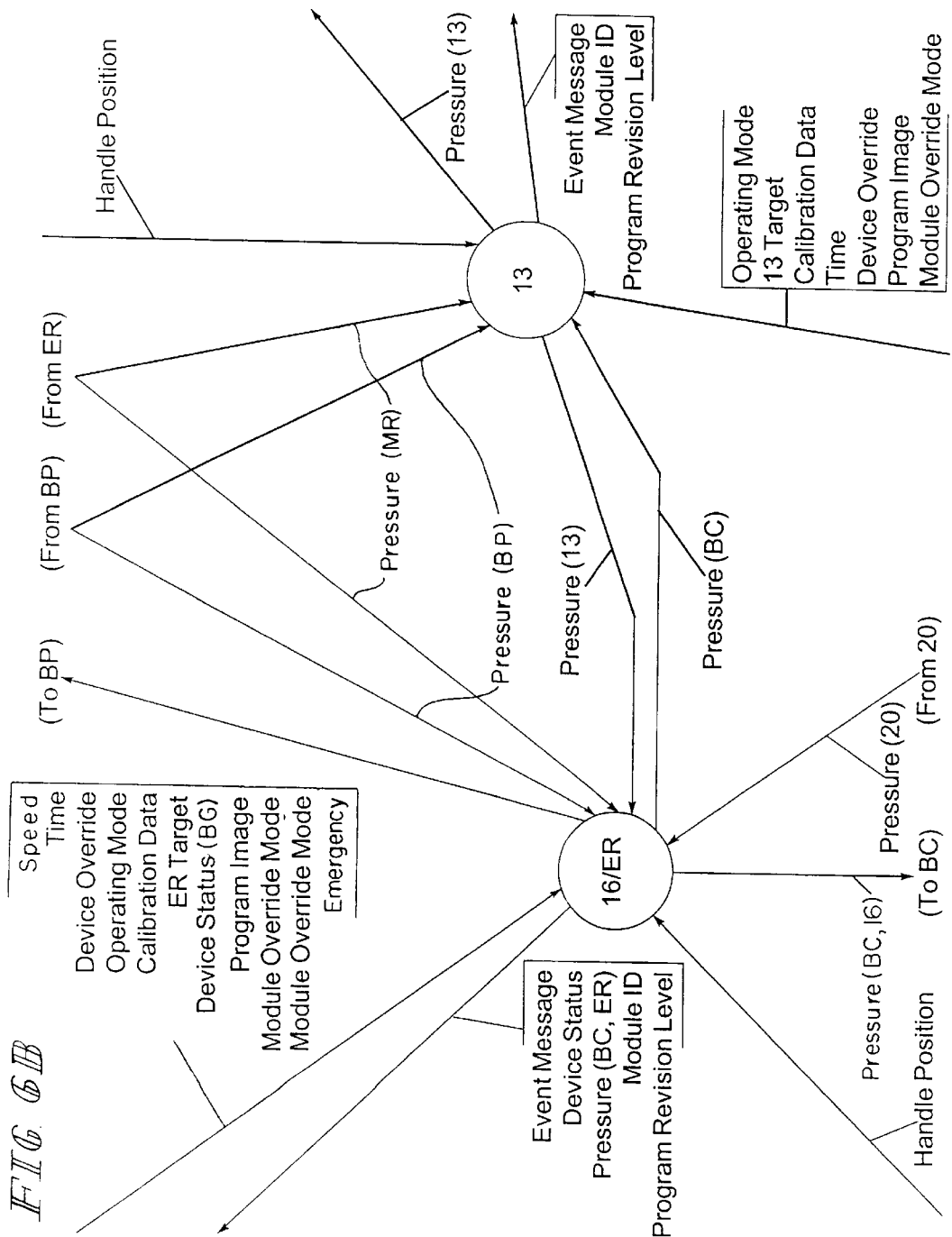
Figure 6C:
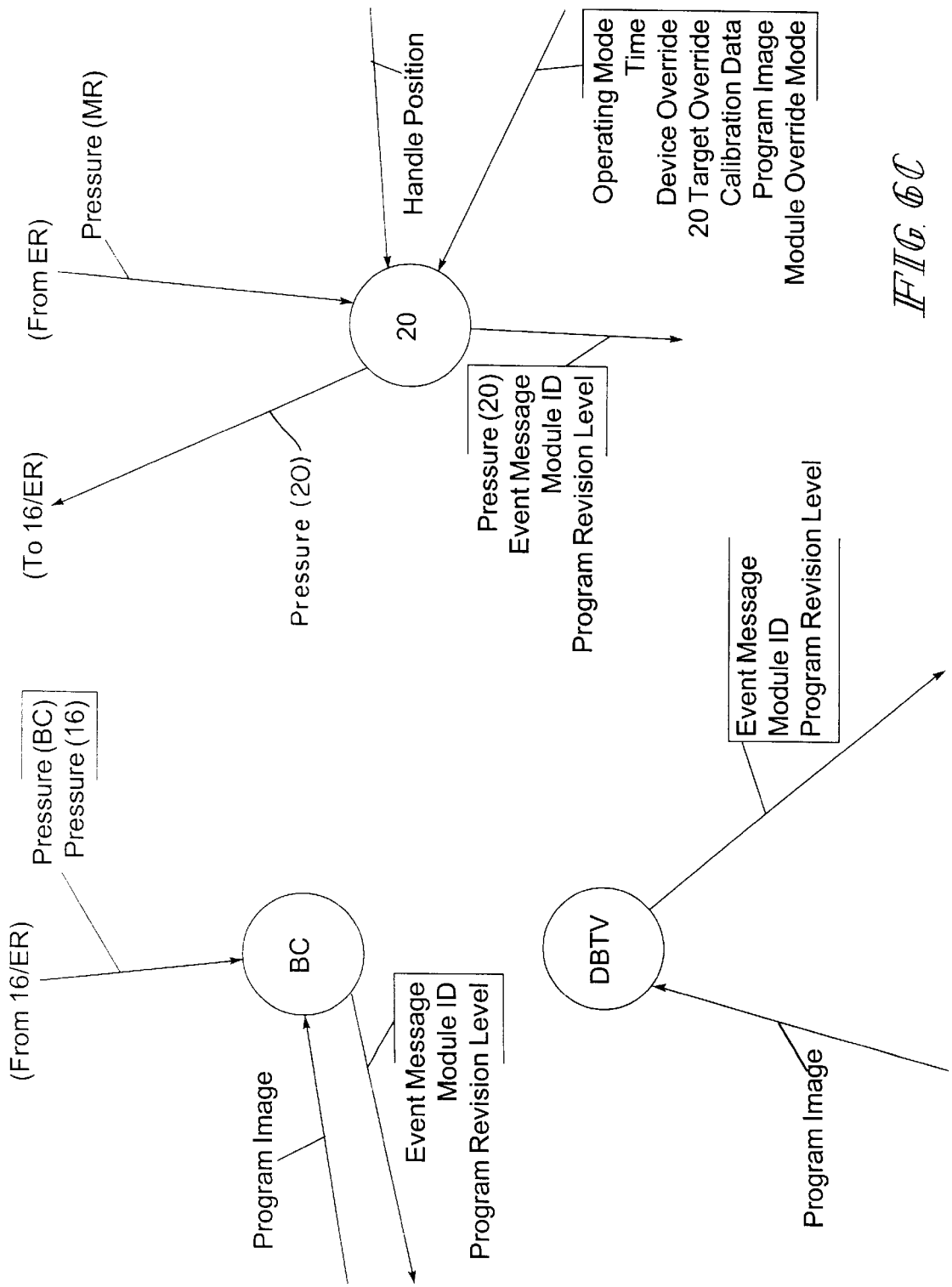

An overview of the data flow diagram for the locomotive brake system of FIG. 4 is illustrated in FIG. 5 and the date flow diagram for the EPCU is illustrated in FIG. 6. The individual line replacement units of the EPCU include Neuron chips or microcomputers which contain self-diagnostic capabilities. Diagnostics from each line replaceable unit can be downloaded for quick, efficient troubleshooting. The modular design allows for ready-track replacement of the LRU's eliminating the need to pull the locomotive out of service. This capability simplifies the maintenance task and offers potential to operate the fleet using a "maintenance-on-condition" strategy. By grouping along natural boundaries and using network nodes, it facilitates the software development. Each network node component combines hardware-software "object" with an inherently clean interface.

Figure 7:
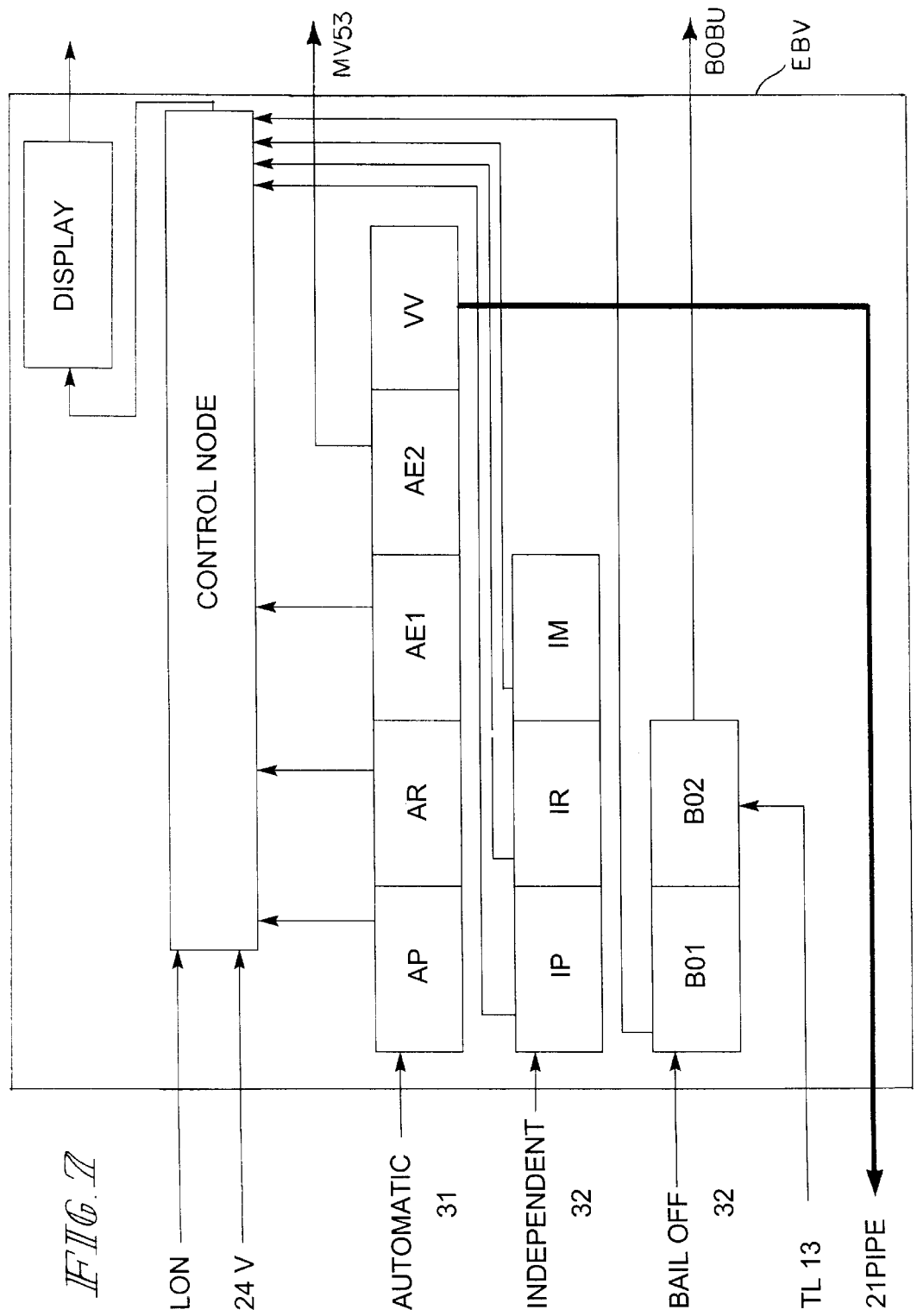
FIG. 7 is a block diagram of an electronic brake valve according to the principles of the present invention.

A block diagram of the electric brake valve EBV is illustrated in FIG. 7. The control node includes communication with the Lon Networks and receives a 24 volt input. Connected to the control node is the display for the equalization reservoir target. The automatic brake handle 31 provides electrical inputs to electrical portions automatic apply, AP, automatic release, AR, automatic emergency 1 and 2, AE1, AE2 and vent valve VV. The output of the automatic apply and automatic release and automatic emergency 1 are provided to the control node. The output of the automatic emergency 2 is provided as an output signal MV53 to electromagnetic valve MV53 of the EPCU to vent the brake pipe. Also responsive to the electrical signal from the automatic brake handle 31, vent valve VV provides a pneumatic vent signal on pipe 21 also to vent the brake pipe in the EPCU.

Figure 8:
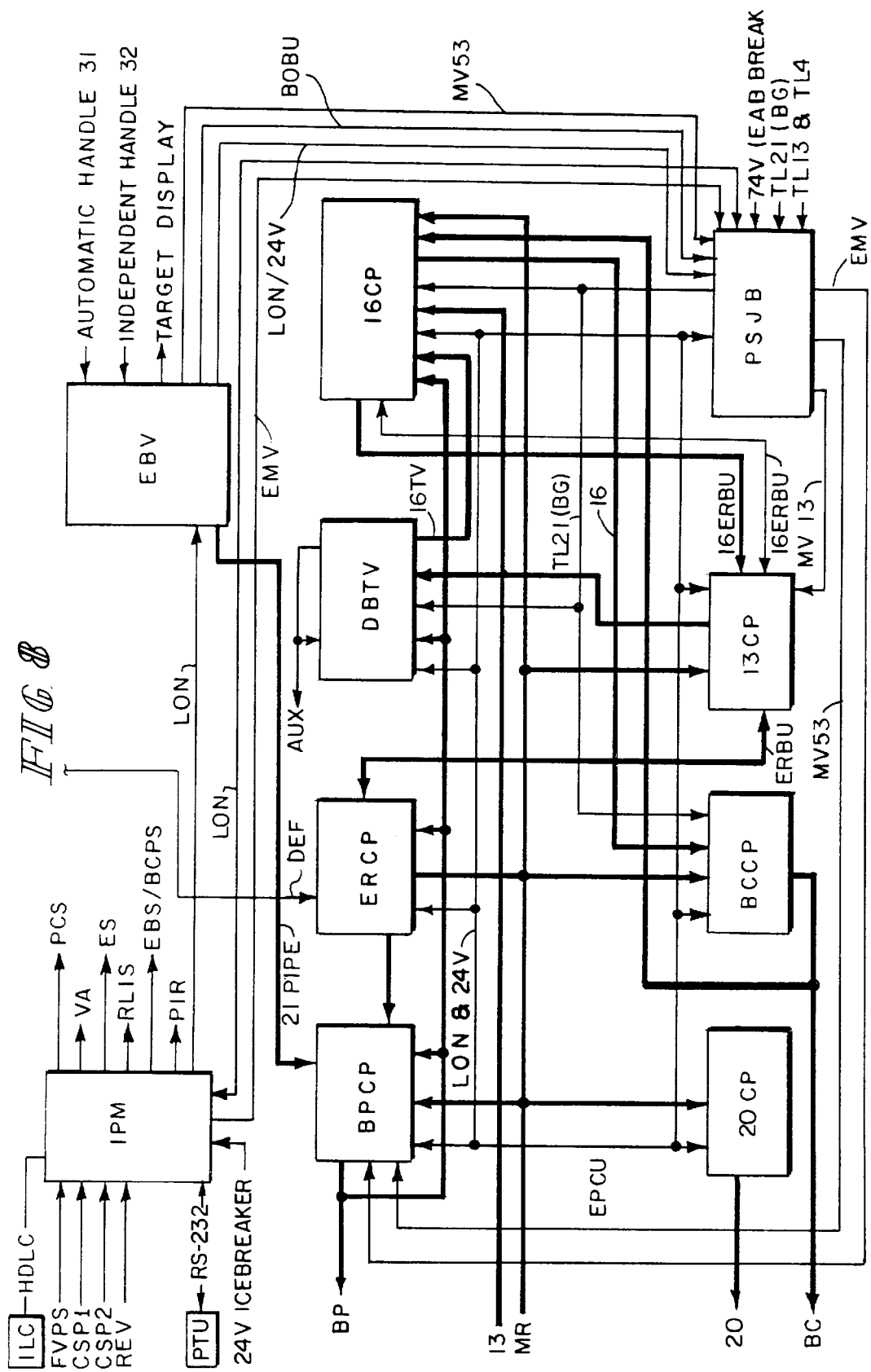
FIG. 8 is a block diagram of the locomotive control unit of FIG. 4.

The independent brake handle 32 provides an electrical signal to the control node via independent pressure section IP, independent release section IR and independent maximum section IM. The electronic bailoff signal from the independent handle portion 32B provides a first bailoff signal BO1 to the control node and a second bailoff signal from section BO2 as a bailoff output signal BOBU to the bailoff portion of the EPCU. A more detailed illustration of the electrical, mechanical and pneumatic interconnection of the elements of the system are illustrated in FIG. 8. The integrated processor module IPM is shown connected to an integrated locomotive computer ILC, and to a portable test unit PTU by an RS 232 connection. The other inputs to the IPM are from the propulsion and dynamic braking controller.

The electropneumatic control unit EPCU includes the brake pipe control module BPCP, an equalization reservoir control portion ERCP, a dead-in-tow triple valve DBTV, a brake signal or 16 pipe control portion 16 CP and independent or 20 pipe portion 20 CP, a brake cylinder control portion BCCP, an actuating pipe or 13 pipe control portion 13CP and a power supply junction box PJGB. Each of these modules are line replaceable units with the electrical interconnection being in the narrow lines and the pneumatic interconnection being in the thicker lines. A communication loop is LonWorks and includes a 24 volt power line.

Figure 9:
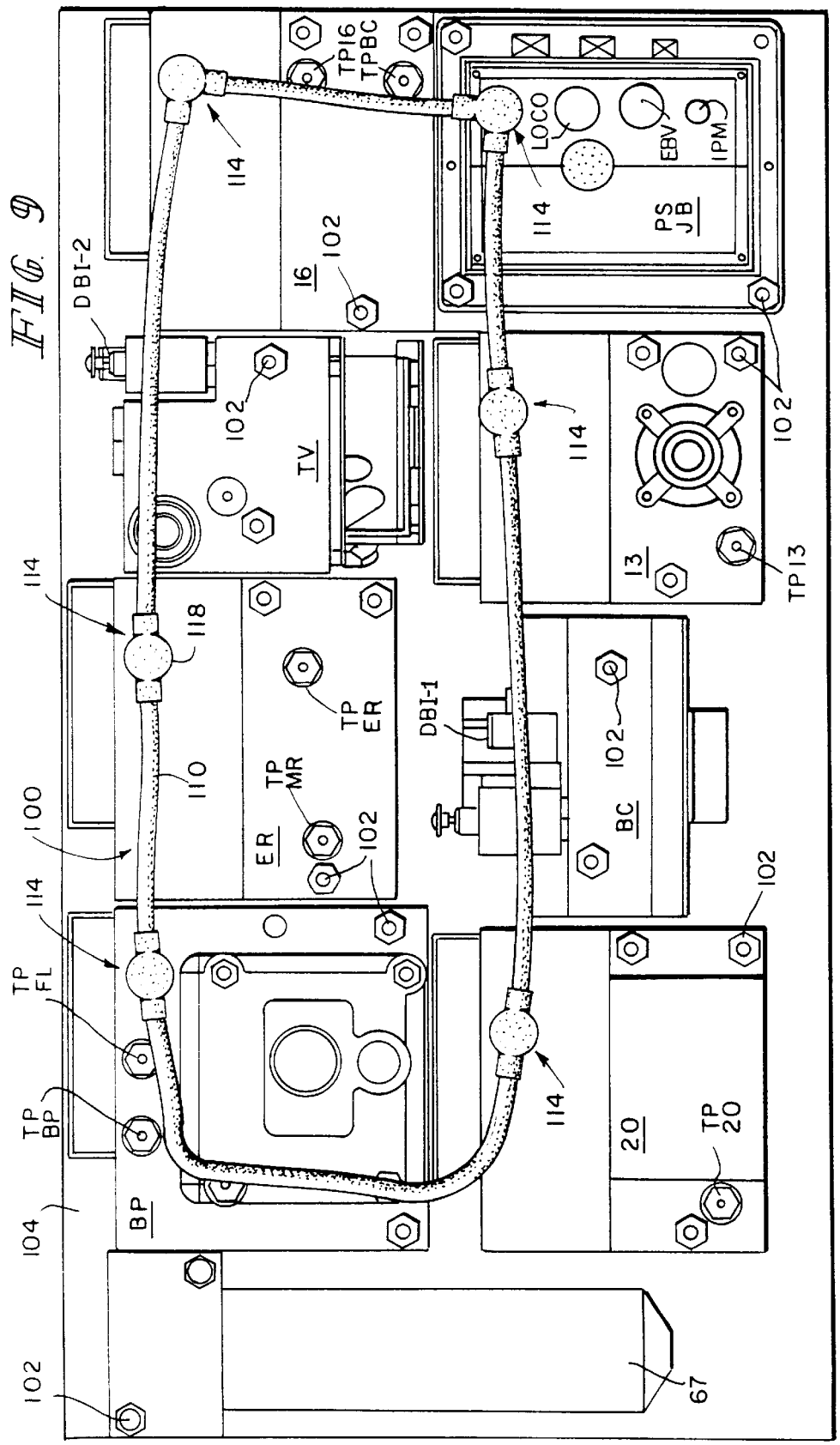
FIG. 9 is a plan view of the electropneumatic control unit incorporating the principles of the present invention.

A view of the individual line replaceable units or modules and interconnection by a single wire harness 100 is illustrated in FIG. 9. The wire harness 100 includes all of the electrical interconnection between the individual line replaceable units or modules with each other and to outside control signals via the power supply and junction box PSJB.

In the particular embodiment shown, there is no connection to the brake cylinder portion BC or the triple valve portion TV. In the preferred embodiment, each of these modules would include a control node or at least some form of communication and therefore, there would be a connection to these modules as well by the wire harness 100. The schematic of the wiring harness is illustrated in FIG. 27 with the connections being illustrated in FIGS. 28a and b and 29a and b and having connector in FIG. 30. These will all be discussed below. By using one wiring harness, the interconnectability and replacability is substantially simplified.

A single sized fastener 102 is used to connect each of the line replaceable units to the manifold 104. It should be noted that all of the required filter 67 are also directly mounted to the manifold. By using a single size or headed fastener, a single tool can be used to remove all of the line replaceable units. It should also be noted that the line replaceable units are designed such as not to weigh more than, for example, 35 pounds. This allows an individual to easily remove and handle the line replaceable units or modules.

Besides the single portion connection or connector for all of the electrical wires using the wiring harness 100, each of the line replaceable modules include the appropriate test points physically on the module. Similarly, each of the modules include the required pressure transducers to be used by their local control node or microprocessor and connection as well as through the wiring harness.

Figure 10:
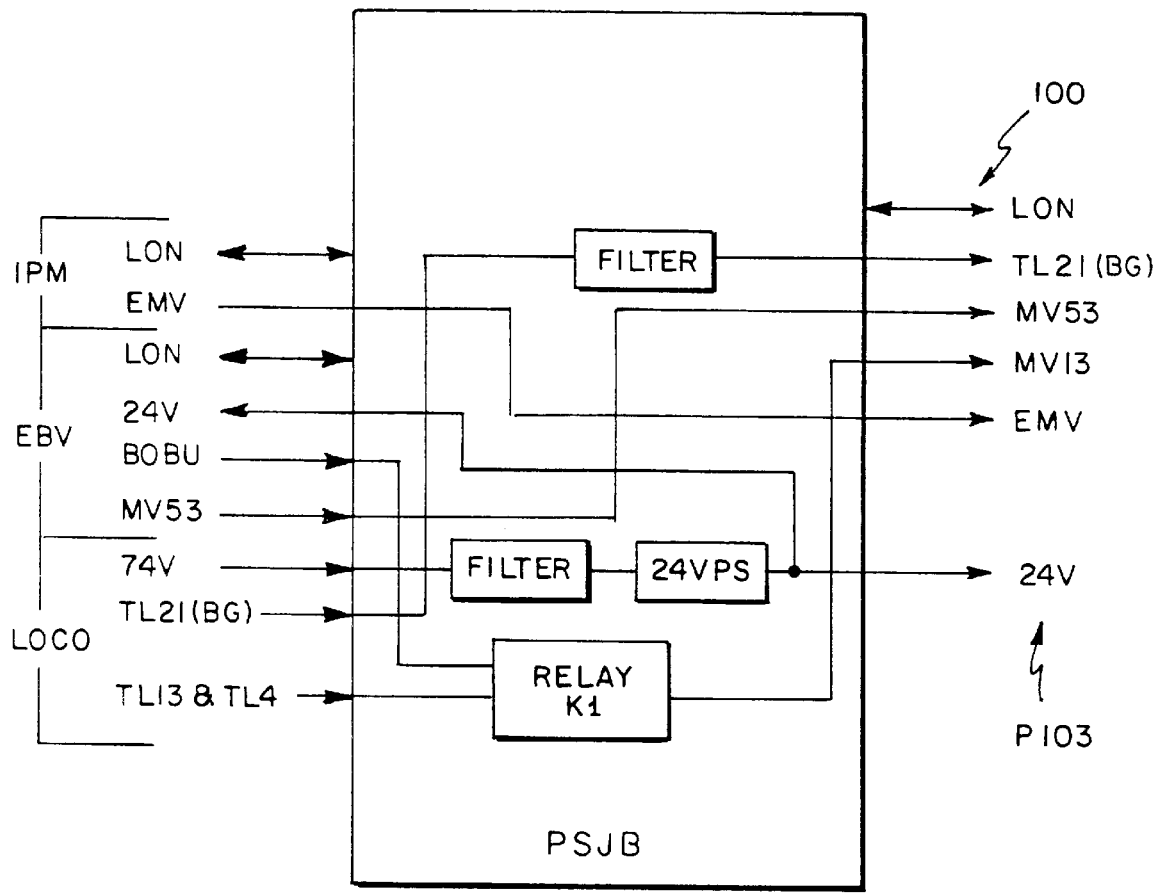
FIG. 10 is a block diagram of a power supply junction box according to the principles of the present invention.

A block diagram of the power supply and junction box PSJB is illustrated in FIG. 10. The inputs from the locomotive are 74 volt input, trainline 21 which is the dynamic brake begin signal and trainlines 13 and 4 which are the positive and negative lines. The interface with the electric brake valve EBV are LonWorks communication line LON, and 24 volts power which is produced by a filter and 24 volt power supply from the 74 volt input from the locomotive. A bailoff back-up signal BOBU which provided to the relay K1 as an input to relay K1, and the vent signal MV 53 for magnetic valve 53 of the EPCU to vent the brake pipe. The input from the integrated process module IPM is the LonWorks line LON and the emergency vent signal EMV.

The dynamic brake begin signal TL 21 is provided through a filter as an output to an output TL 21 to the line replaceable units. The bailoff back-up signal BOBU is provided through the relay K1 to magnetic valve MV13 of the line replaceable unit for the 13 portion. An automatic emergency signal MV 53 from the electrical brake valve is provided as an output MV 53 to the brake pipe control portion BPPC.

Although individual cables bring the input from the IPM, EBV and LOC to the power supply junction box, all of the electrical outputs to the line replacement units or modules are preferably via the wire harness 100. The embodiment shown in FIG. 9 where the brake cylinder control portion BCCP and the triple valve portion TV do not include electronic elements, in one embodiment, they may each individually include dynamic brake interlocks. In such a case, the dynamic brake interlock electrical signal TL 21, would be connected either individually by an individual wire or as part of the wiring harness 100.

Figure 11:
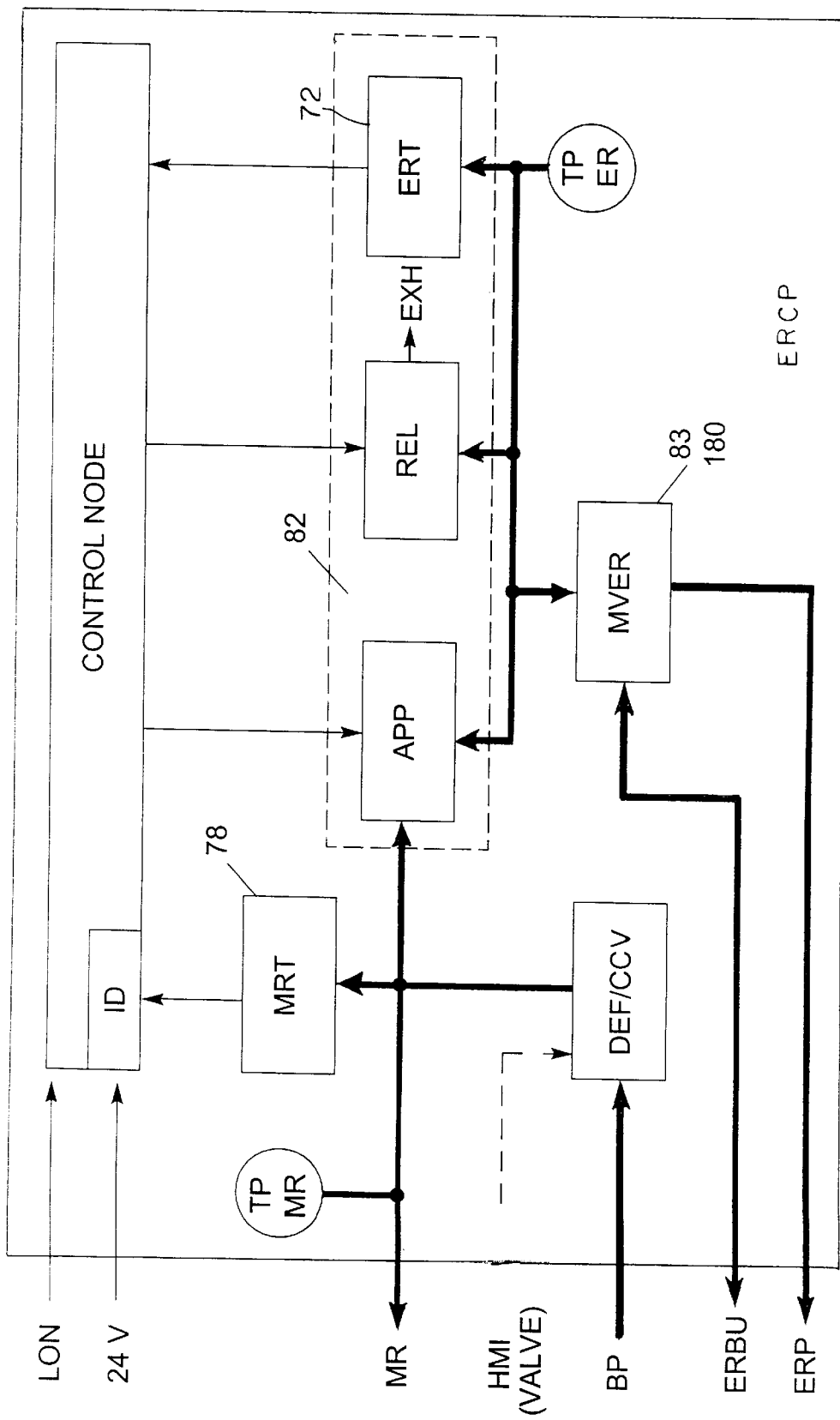
FIG. 11 is a block diagram of the equalization reservoir control portion according to the principles of the present invention.

The equalization reservoir control portion as illustrated in FIG. 11 includes a control node connected to the LON network and receiving a 24 volt supply. The main reservoir MR is connected to the equalization reservoir controller 82 which includes an apply and release valve and an equalization reservoir transducer 72 connected to the output thereof. A main reservoir transducer 78 is also included. The equalization reservoir test points ERTP and main reservoir test points MRTP are also provided on the ERCP module. The brake pipe is connected through DEF/CCV which includes a charging choke and check vale which allows charging of the main reservoir from the brake pipe. An equalization reservoir back-up signal ERBU from the 16 module is provided to the electropneumatic equalization reservoir (ER) select valve MVER 83/180. The ER select valves selects between the ERBU signal or the output of the ER pressure controller 82 of the control node. The electropneumatic valves of the ER pressure controller 82 are also controlled by the control node. The output of the ER select valve 83/180 is ERP which is a pressure that controls the pressure at the equalization reservoir.

Figure 12:
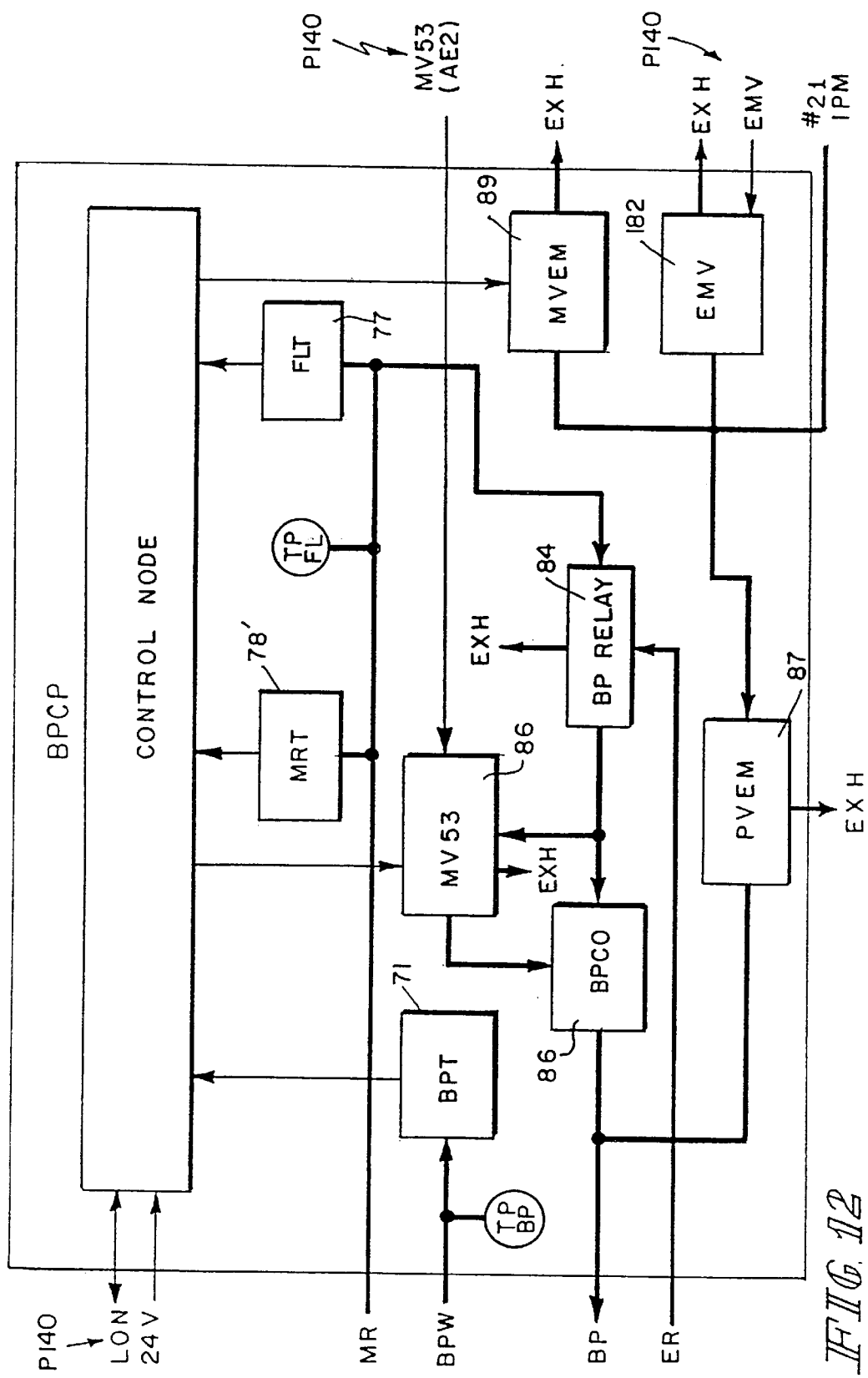
FIG. 12 is a block diagram of the brake pipe control portion according to the principles of the present invention.

The brake pipe control portion or module BPCP as illustrated in FIG. 12 includes a control node interconnected to the LON and receiving a 24 volt power signal. The main reservoir is connected to the brake pipe control module which includes a second main reservoir transducer 78' and main reservoir flow transducer 77. A flow test point TPFL is also provided. The main reservoir MR is also connected to the brake pipe relay valve 84 which receives a control signal from the equalization reservoir ER. The output of the brake pipe relay 84 is provided to the pneumatic brake pipe cut-off valve 86 which receives a control signal from an electropneumatic MV 53. MV 53 is controlled by the control node and also receives an electric signal MV 53 from the automatic handle 31 of the electric brake valve EBV as illustrated in FIG. 7 through the power supply junction box. The brake pipe transducer 71 is connected to the brake pipe at the vent valve at either end of the locomotive and provides its output to the control node. A brake pipe pressure test point TPBP is also provided. If the present locomotive is in the lead mode, it provides control of the brake pipe. If not, the brake pipe cut-off 86 is activated to isolate the brake pipe from the brake pipe control brake pipe relay 84.

The brake pipe control portion BPCP includes brake pipe venting independent of the brake pipe relay 84. A pneumatic brake pipe vent valve PVEM 87 vents the brake pipe in response to pneumatic signals. One of the pneumatic signals is the 21 pipe from the automatic handle 31 of the electric brake valve EBV of FIG. 7. The second pneumatic input for the brake pipe vent valve 87 is from electropneumatic valve MVEM 89. It receives its control signal from the local control node. The local control node monitors the brake pipe through the brake pipe transducer 71 and upon sensing an emergency reduction, activates the electropneumatic valve MVEM to activate the brake pipe vent valve 87 to immediately vent the brake pipe. This propagates and accelerates the emergency signal transmission down the brake pipe.

Different from the prior system of FIGS. 1 and 3, an additional electropneumatic valve, EMV 182 is provided to provide a pneumatic signal to activate the brake pipe vent valve 87 in response to an electrical signal EMV from the integrated process module IPM. The IPM provides back-up to the local control node and the electrical magnetic valve 89 and the electric brake valve EBV. The IPM may activate an emergency brake condition independent of the operator handle or brake pipe pressure.

Figure 13:
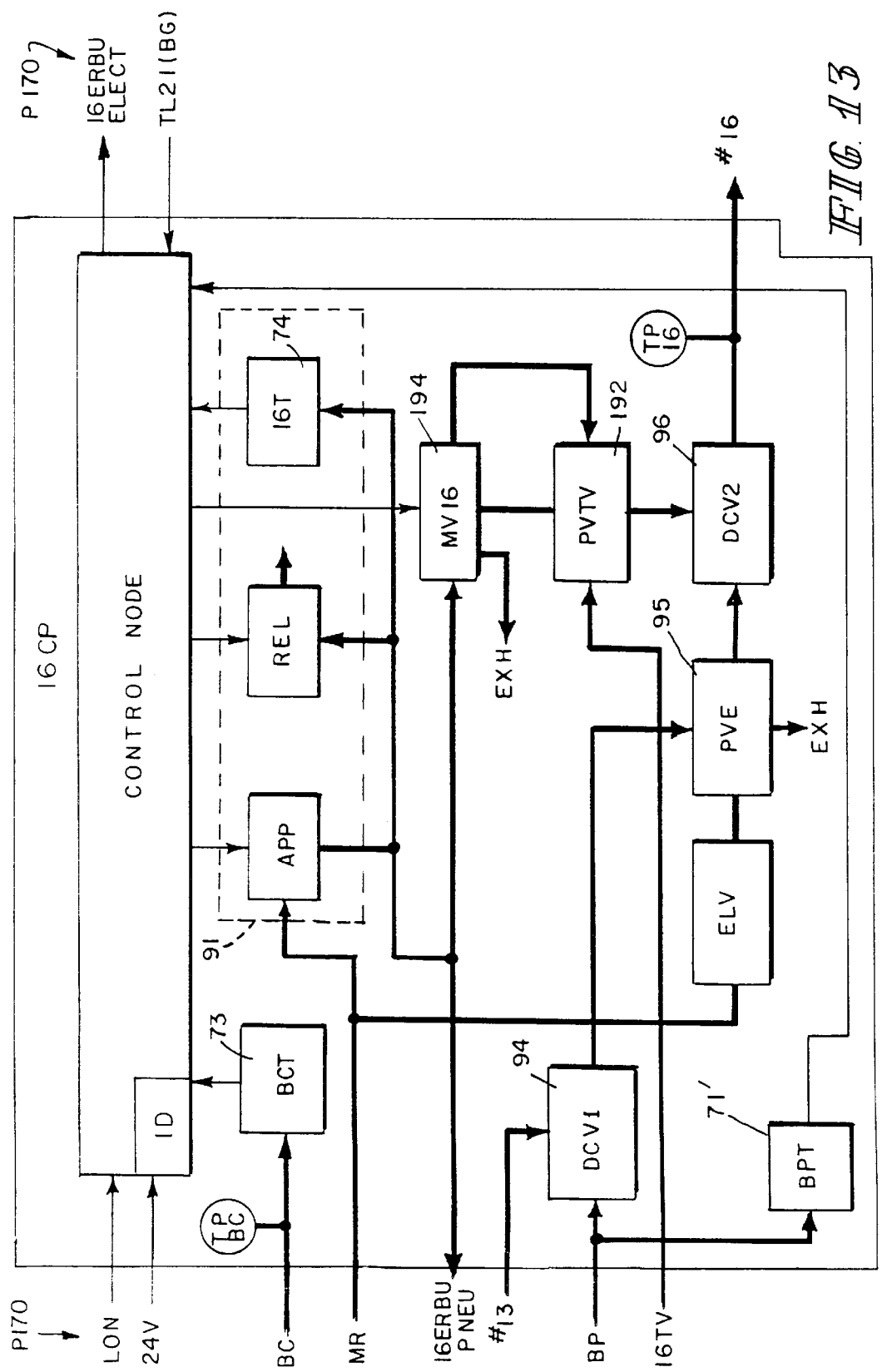
FIG. 13 is a block diagram of the brake signal or 16 pipe control portion according to the principles of the present invention.

The 16 pipe control portions 16CP or brake signal portion includes a control node connected to the LON works and receives the 24 volt power as shown in FIG. 13. The brake cylinder is monitored by brake cylinder transducer 73 and also includes a brake cylinder test point TPBC. The main reservoir MR is connected to the control reservoir pressure controller 91 which include apply and releases valves under the control of the control node with their output monitored by the 16 pipe transducer 74. The output of the control reservoir pressure controller 91, which is a brake signal, is provided to electromagnetic MV 16 under the control of the control node whose output is connected to a control reservoir select valve PVTV 192. The other input to the control reservoir select valve 192 is a control reservoir back-up signal 16 TV from the triple valve 93, illustrated in FIG. 17.

In normal operations, the select valve 192 selects the output of the control reservoir pressure controller 91 and provides its output to a double check valve 96. The other input of the double check valve 96 is from an emergency valve PVE 95 which receives its control input from a double check 94 which selects the higher of the brake pipe pressure BP or the actuating pipe pressure 13. A regulator valve ELV connects the main reservoir to the emergency valve 95.

The 16 control portion also includes a second brake pipe transducer 71'. Not only does the extra brake pipe transducer 71' act as a back-up to the brake pipe transducer 71 in the brake pipe control module of FIG. 12, but also allows the control node of the 16 control portion to directly and independently determine brake pipe pressure. The output of the control reservoir pressure controller 91 is provided as a pneumatic signal 16 ERBU to an equalization reservoir select electropneumatic valve which is controlled by the electrical signal 16 ERBU SELECT from the control node of the 16 control portion. This allows the control node of the 16 control portion to operate the control reservoir pressure control 91 as a back-up for the equalization reservoir control module 82.

Figure 14:
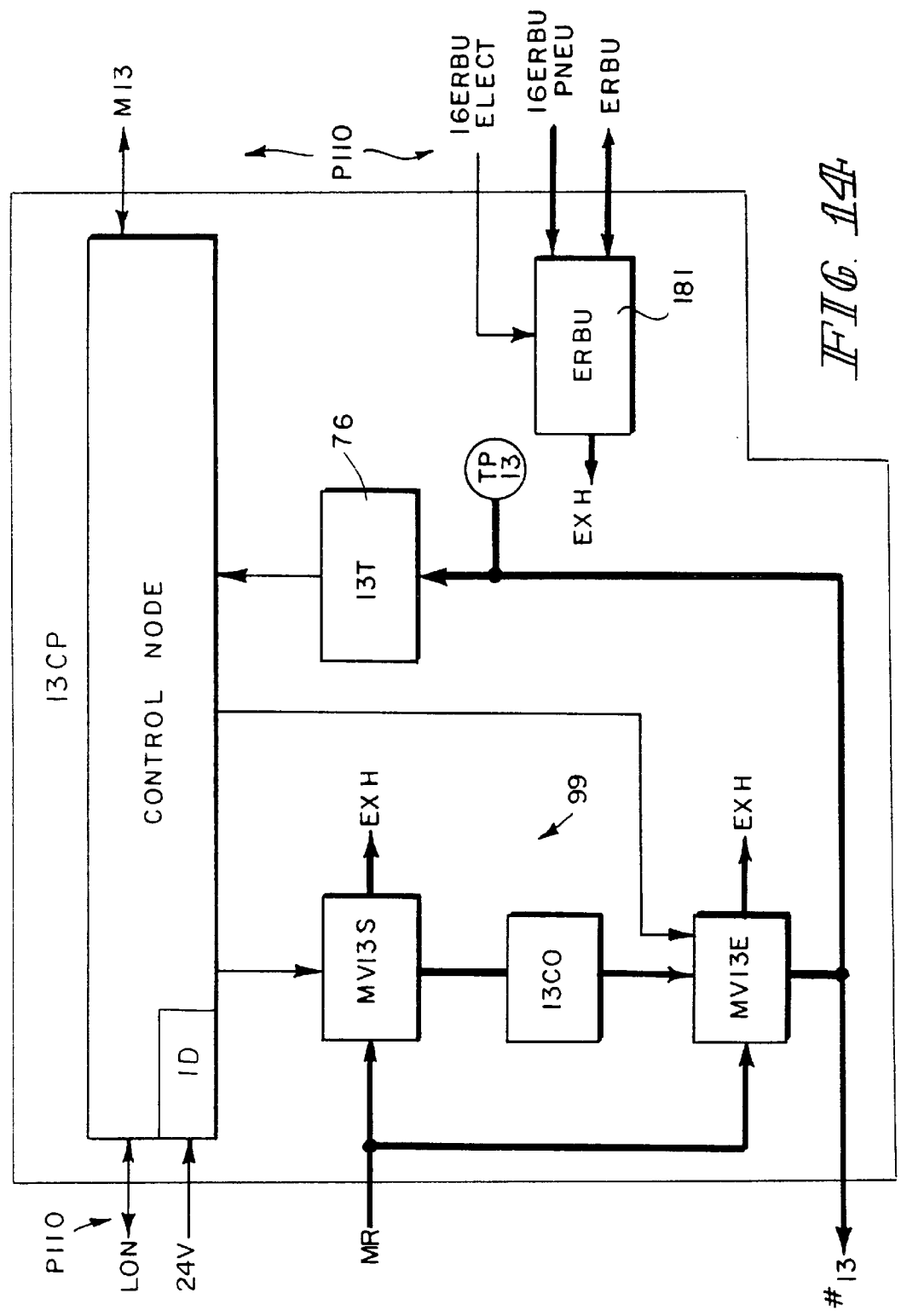
FIG. 14 is a block diagram of the actuating or 13 pipe control portion according to the principles of the present invention.

The equalization reservoir backup valve 181, as illustrated in FIG. 14 is located in the 13 control portion, transmits the 16 ERBU signal under the control of the electric 16 ERBU signal as the equalization reservoir back-up signal ERBU to the equalization reservoir select valve 180 in the equalization reservoir control portion of FIG. 11. It should be noted that the location of the equalization reservoir back-up valve 180 on the 13 or actuating portion of FIG. 14 is a matter of convenience and availability of real estate. Since the location can be anywhere within the system, preferably to be part of the 16 control portion of FIG. 13 or the equalization reservoir control portion of FIG. 11, but neither had sufficient space to accommodate an additional electropneumatic valve.

When the output of the control reservoir pressure controller 94 is used as the equalization reservoir back-up, the secondary brake signal 16 TV from the triple valve 93 of FIG. 17 is provided as the brake signal input to the 16 pipe. As will be discussed with respect to FIG. 17, this is purely a pneumatically driven signal off the brake pipe and not an electrically controlled signal under a control node. A control node of the 16 control portion also receives the dynamic brake begin signal TL 21.

The 13 control or actuating pipe control portion 13CP as illustrated in FIG. 14 includes a control node receiving the LON Network and a 24 volt power line. It also receives an electrical input signal MV 13 which is an electrical bailoff signal from the electric brake valve EBV of FIG. 7 via the relay K1 of the power supply and junction box of FIG. 10. The control module 13CP controls the 13 pipe by an actuating pressure controller 99 which includes an electropneumatic supply valve MV 13S, a pneumatic cut-off valve 13 CO and an electropneumatic vent valve MV 13E. A 13 transducer 76 is connected to the control node and a pressure test point TP13 is also provided in the 13 control portion.

Figure 15:
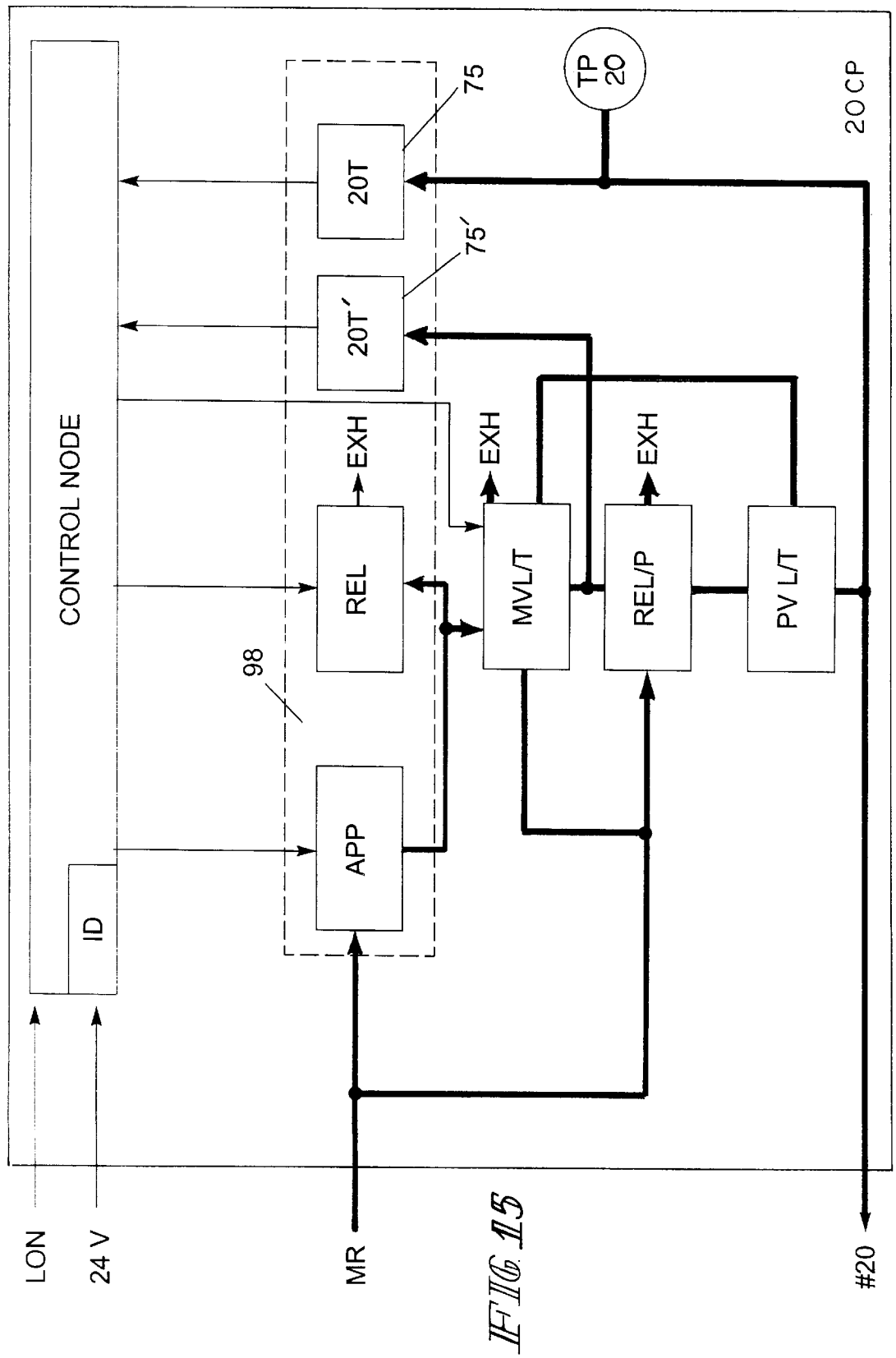
FIG. 15 is a block diagram of the independent or 20 pipe control portion according to the principles of the present invention.

The independent application and releasor 20 control portion 20CP as illustrated in FIG. 15 includes a control node connected to the LON Network and receiving a 24 volt power supply. The control node controls the independent pressure controller 98 which includes an apply and release valve. A pair of 20 pressure transducers 75,75' and a 20 pipe test point TP20 are also provided in the module. The output of the independent pressure controller 98 is provided through an electropneumatic valve MVL/T to a relay valve REL/P. The output of the relay valve is provided by a piloted cut-off valve PVL/T to the 20 pipe. The electropneumatic valve MVL/T also includes a cut-off valve portion to simultaneously disconnect the independent pressure controller 98 from the relay REL/P and to disconnect the output of the relay REL/P from the 20 pipe.

Figure 16:
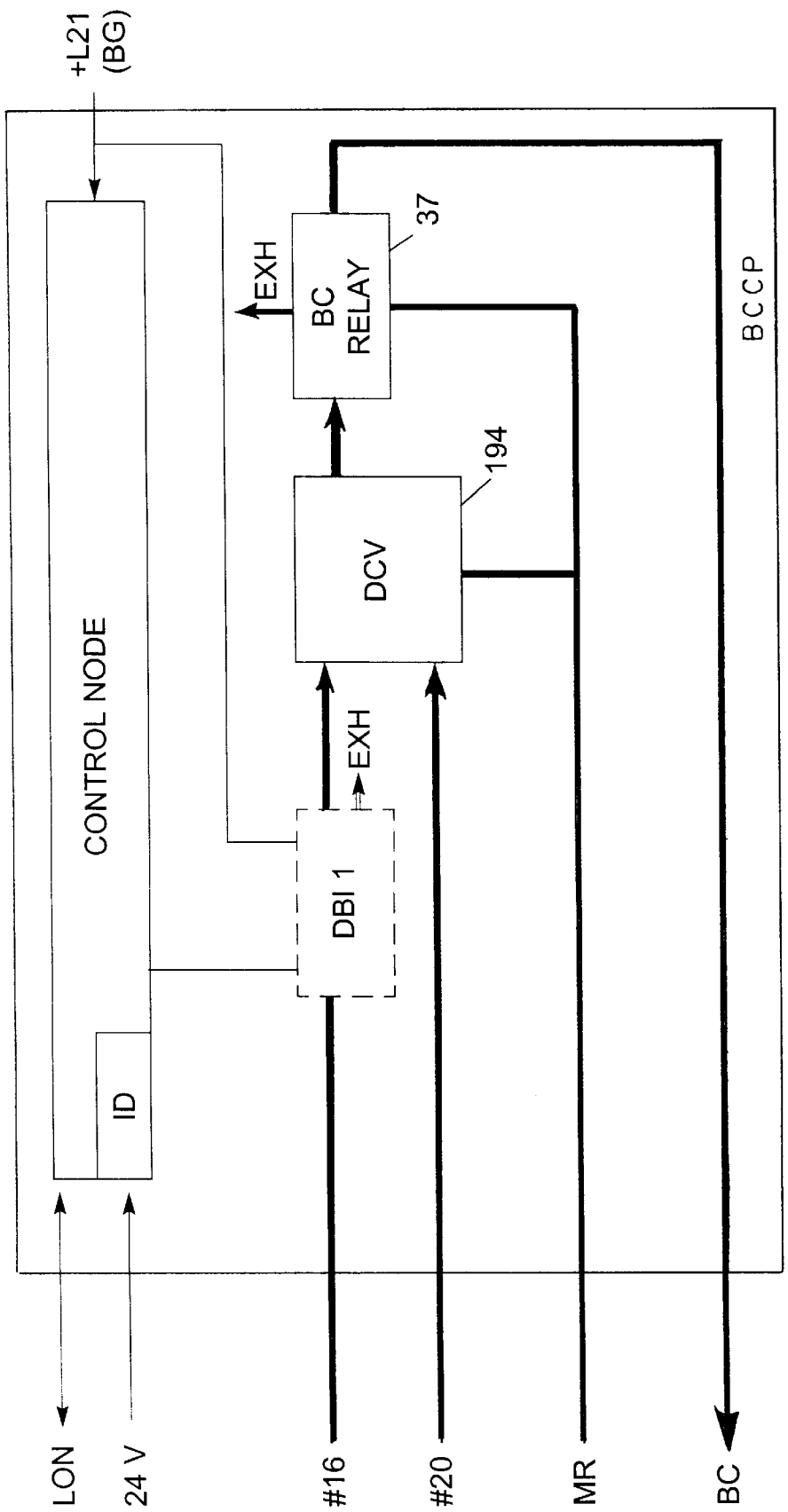
FIG. 16 is a block diagram of the brake cylinder control portion according to the principles of the present invention.

The brake cylinder control portion BCCP as illustrated in FIG. 16 includes a control node connected to the LON Network and receive a 24 volt power supply. The other input to the control node is the dynamic brake begin signal TL 21. As previously discussed, preferably a control node is provided. In the embodiment of FIG. 9, the control node is not provided and the TL 21 wire is connected directly to the dynamic brake interlock DBI1 illustrated in dash lines. A double check valve DCV 194 provides the higher of either the 16 pipe signal or the 20 pipe brake signal to control the brake cylinder relay 37 which controls the brake cylinder port BC.

A port is provided on the brake cylinder control portion BCCP to receive a resetting dynamic brake interlock DBI1 as illustrated in FIG. 9. If the dynamic brake interlock DBI1 is not provided in the port, the port is capped and there is a direct connection between the 16 pipe input and the double check valve 194. If a dynamic brake interlock DBI1 is provided, it is under the control of the control node in response to the dynamic brake begin signal TL 21, and will allow resetting of the pneumatic brake control after the dynamic brake is released.

The triple valve module of FIG. 17 includes a control node connected to the LON Network and receives a 24 volt power supply. As with the brake cylinder control portion, a dynamic brake signal TL 21 (BG) is provided to the control node to control a dynamic brake interlock DBI2. The control node may not be used and the signal may be connected directly to the dynamic brake interlock. The dynamic brake interlock DBI2 is shown in phantom. The dynamic brake interlock DBI2 is received in a port in the control in the triple valve control module, as shown in FIG. 9, between the main reservoir MR and a double check valve DCV. The dynamic brake interlock DBI2 is a non-resetting interlock. When the dynamic interlock DBI2 is not present, the main reservoir is blocked and the 13 pipe is connected directly to the bail off valve BO. The electropneumatic control portion EPCU may include no dynamic brake interlock or a first or second, but not both. The second input to the double check valve is the 13 pipe. Higher of the two signals is provided to a pneumatic bailoff valve as well being fed back to the 13 portion.

A triple valve DBTV is responsive to the difference in the brake pipe and an auxiliary reservoir pressure to charge the auxiliary reservoir from the brake pipe and to provide an output signal to the bailoff valve BO. The output of the bailoff valve is provided as a pneumatic secondary or back-up brake cylinder brake signal at output 16 TV. This is provided to the 16 portion. electropneumatic components are mounted.

The control nodes of each of the modules or line replacement units of the electropneumatic control is made of a single design. The control node provides electrical control of the control portion and communication with other modules as well as the rest of the system by transmitting commands and data over the LonWorks Network. The control node reads analog transducers and drives the magnetic valves on the control portion with its designated function and the commands it has received. The operation of the control node is controlled by software which is reprogrammable in the field. It is also capable of maintaining a history or a log of the control portion and system information which is important for its operational reliability as well as information which is available for diagnostics and trouble shooting.

The standard block is illustrated in FIG. 18. A Neuron communicates through a transceiver with the LON Network. It includes a power reset circuit and an oscillator. The power source receives the 24 volt DC input and provides 5 volt DC digital and 5 volt DC analog output. It includes a flash ROM and a non-volatile RAM. Four analog inputs are conditioned by an input signal conditioner and four channel multiplexed analog to digital converter converts the analog inputs to digital for the Neuron. One of the inputs is provided as an analog signal to an EPA circuit and to a high level driver for four magnetic valve optidrivers. A digital to analog converter connects the Neuron to the EPA circuit. The EPA circuit is a closed loop analog driver of the AW4 which provides pulse with modulated signals to electropneumatic apply and release control valves. Two digital inputs are optically isolated and connected to the system. The connection of the control node of FIG. 26 for five of the control portions or modules is shown in Table 1.

| Generic Signal Name | System Signal Assignment | | | | |
|---|---|---|---|---|---|
| | BPCP | ERCP | 13CP | 16CP | 20CP |
| Digital #1 | — | — | — | BGTL | — |
| Analog #1 | BPT | MRT | 13 T | 16 T | 20 T |
| Analog #2 | FLT | ERT | — | BCT | — |
| Analog #3 | MRT | — | — | — | — |
| Digital MV #1 | MV53 | MVER | MV13S | MV16 | MVLT |
| Digital MV #2 | MVEM | — | MV13E | MVERBU | — |
| Digital MV #2 | MVEM | — | MV13E | MVERB | — |
| Digital MV #3 | — | APP | — | APP | SUPP |
| Digital MV #4 | — | REL | — | REL | REL |

The specific wiring of the wiring harness 100 is illustrated in FIG. 19. The dashed lines around the brake control portion BCCP and the triple valve DBTV illustrate that these connections may not be provided by the wiring harness in the configuration if there is no control node the connection of the wire for the dynamic brake interlock may be in the harness 100 or may be a separate direct connection.

By mounting the power supply and junction box PSJB on the manifold 104, the manifold acts as a heat sink for the power supply. This provides a substantial mass of metal as a heat sink. It reduces the physical size of the power supply since an additional heat sink is not required. The heat does not adversely affect the operation of the pneumatics.

FIGS. 5 and 6 indicate that each of the electric pneumatic control units include a module ID. This ID is stored in its control node or other storage device on the module. This module ID is communicated to the integrated processor module IPM. The IPM can keep a log of the specific ID of the individual modules. No two modules will have a duplicate number. Thus, the IPM can keep a log of which units are in the system, how long they have been in the system and what conditions they have been exposed to, and also verify in the look-up table whether that ID is an appropriate structured module for the train configuration. Also, if defects are sensed for that module, the control node and IPM can record such information. Also, since each of the modules are line replaceable units, and include a control node with its memory, it can also record events and data for future use and diagnostics when the system is taken in for repair or the individual modules are removed or tested.

The IPM can use the module ID to detect when a module has been replaced and then use this knowledge to clear the event log for its summary, and predictive summary files for the new module. Each of the control nodes can record an event log. The event log is a data store that contains run time information. The system can include background diagnostic, predictive diagnostic and maintenance information and self-test failure to program errors, fail program reach-out. By providing a local controller to each module, the modules are substantially intelligent allowing communication with other modules and the system as well as maintaining a history or log of events, unique to that particular module.

With respect to the history, the IPM can test and monitor the system at power-up or when a new module is added. The information on the module is an identification number ID, the revision level of its software, history of what system it has been on with date and time. It may also include module faults and a short snapshot of the system variables at failure. It may also include, for example, the cycle counts for apply and release valves. The collection of this information at the individual modules by the IPM, allows analysis and early repair of parts with or without failure, even without failure during normal maintenance or when the locomotive is brought into the yard.

The control nodes also have the capability to have new versions of application software down loaded. The IPM can also use the program revision to determine whether modules of the system are running on compatible versions of the software. Because of the distributed design, this is important. The IPM can read all versions of software of each of the line replaceable units and the electrical brake valve. It can determine which versions are compatible with each other. If there is incompatibility, it will download appropriate older versions to the line replacement unit or the electrical brake valve to match the compatibility of the oldest software. Alternatively, if there is enough storage available at each of the modules, the modules may switch themselves between appropriate versions to maintain compatibility. With respect to 16 CP, the control node 16 may include the software to operate as a 16 control valve and the software to operate the equalization reservoir portion. Alternatively, it may include only the software to operate as a 16 portion with the software for the equalization reservoir down loaded upon a change of its roles.

As can be seen from FIGS. 5 and 6, the handle position from the controller logic of the electric brake valve EBV is provided to the EPCU and most of the line replaceable units. The control node controls the pressure at its module using the handle position as the target pressure value.

Calibration parameters and calibration data are exchanged between the EPCU and the IPM. One method of calibration is to command a specific pressure at a specific port on the manifold by transmitting a pressure value from the IPM to the EPCU. The actual value is measured external the EPCU and a comparison made between the actual measured value and the value measured by the EPCU. The offset can then be adjusted either at the IPM or at the individual modules of the EPCU.

The operating node for the electronic air brake system (EAB) include freight, passenger, lead cut-in, lead cut-out, and trail. This information is provided as illustrated in FIG. 5 between the IPM and the EPCU. The device status is the status of a device in each of the modules. This is generally a digital value representing either that the device is opened/closed, energize/de-energize, ETC. The IPM heartbeat is sent between the IPM and the EPCU. The modular operating modes include normal, monitor and test. If the command to be in the test or monitor mode is interrupted, the EPCU modules operate in their normal mode. If the heartbeat is transmitted in combination with either the monitor mode or the test mode, the EPCU and their individual modules are maintained in their monitor test mode as long as the heartbeat is sent.

When the EPCU is operated in its normal mode, any device override command is ignored. In the monitoring mode, the modules operate normally. All device override commands will be obeyed. This allows individual devices to have their status changed during the normal operation of the remainder of the modules. In the test mode, the modules do not perform this normal device control operations. The device is willing to be controlled by device override commands.

Although the control nodes are Neuron chips are part of the LonWorks, the control node may also be a microcomputer in a computer network.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A modular locomotive brake control unit comprising:
   a manifold having mounted thereon at least two of brake pipe module, brake cylinder module, brake signal module, equalization reservoir module, independent brake module and actuating module;
   a storage having identification data therein on each of said modules; and
   a unit controller for receiving said identification data from each of said modules.

2. A control unit according to claim 1, wherein each of said modules includes a module controller including and connecting said storage to said unit controller.

3. A control unit according to claim 2, wherein said module controllers store event data.

4. A control unit according to claim 2, wherein said module controllers store an operating program and program identification data.

5. A control unit according to claim 4, wherein said unit controller receives said program identification data from said module controllers.

6. A control unit according to claim 4, wherein said unit controller transfers operating programs to said module controllers.

7. A control unit according to claim 2, wherein each of said modules include a pressure transducer connected to said module controller and said unit controller receives said pressure values from said module controllers.

8. A control unit according to claim 2, wherein each of said modules include an electropneumatic device connected to said module controller and said unit controller receives device status from said module controllers.

9. A control unit according to claim 8, wherein said unit controller sends device override commands to said module controllers.

10. A control unit according to claim 8, wherein said device controls pressure at said module to a target pressure in response to brake handle position signals received by said module controller; and said unit controller sends target override pressures to said module controllers to override handle responsive target pressure.

11. A control unit according to claim 8, wherein said device controls pressure at said module to a target pressure; and said unit controller sends target pressures to said module controllers.

12. A control unit according to claim 2, wherein said unit controller sends module override mode commands to said module controllers.

13. A control unit according to claim 2, wherein said unit controller sends operating mode commands to said module controllers.

14. A control unit according to claim 2, wherein said unit controller sends calibrating data to said module controllers.

15. A control unit according to claim 2, wherein said module controllers includes an event log and stores data therein.

16. A control unit according to claim 15, wherein said module controllers stores data in said event log upon determining an event.

17. A control unit according to claim 15, wherein said module controllers stores data in said event log upon predicting an event.

18. A modular locomotive brake control unit comprising:
   a manifold having mounted thereon at least two of brake pipe module, brake cylinder module, brake signal module, equalization reservoir module, independent brake module and actuating module;
   each of said modules includes a module controller;
   an electropneumatic device connected to said module controller and controlling pressure at said module controller; and
   a unit controller connected to each of said module controllers.

19. A control unit according to claim 18, wherein said unit controller sends calibrating data to said module controllers.

20. A control unit according to claim 18, wherein said device controls pressure at said module to a target pressure; and said unit controller sends target pressures to said module controllers.

21. A control unit according to claim 18, wherein said device controls pressure at said module to a target pressure in response to brake handle position signals received by said module controller; and said unit controller sends target override pressures to said module controllers to override handle responsive target pressure.

22. A control unit according to claim 18, wherein each of said modules include a pressure transducer connected to said module controller and said unit controller receives pressure values of said pressure transducers from said module controllers.

23. A control unit according to claim 22, wherein said modules send said pressure values of said pressure transducers to another module controller.

24. A modular locomotive brake control unit comprising:
   a manifold having mounted thereon at least two of brake pipe module, brake cylinder module, brake signal module, equalization reservoir module, independent brake module and actuating module;
   each of said modules includes a module controller;
   a unit controller for interfacing with locomotive units;
   a brake handle controller; and a communication network interconnecting said module controllers, said unit controller and said brake handle controller.

25. A control unit according to claim 24, including a junction box on said manifold and said module controllers are connected in said communications network with said unit and brake handle controllers through said junction box.

26. A control unit according to claim 24, wherein said controllers are connected as nodes in a LonWorks communications network.

27. A control unit according to claim 24, wherein said communication network includes electropneumatic brake controllers on individual cars in a train.

28. A control unit according to claim 24, wherein said module controllers and brake handle controller each include identification data; and said unit controller receives said identification data from said module controllers and brake handle controller.

29. A control unit according to claim 24, wherein said module controllers store event data.

30. A control unit according to claim 29, wherein said unit controller receives said event data from said module controllers.

31. A control unit according to claim 24, wherein said module controllers and brake handle controller each store an operating program and program identification data; and
said unit controller receives said program identification data from said module controllers and brake handle controller.

32. A control unit according to claim 31, wherein said unit controller transfers operating programs to said module and brake handle controllers.

33. A control unit according to claim 31, wherein said unit controller and said module controllers each include a clock and said unit controller periodically sends a time signal to said module controllers.

34. A modular locomotive brake control unit comprising:
a manifold having mounted thereon at least two of brake pipe module, brake cylinder module, brake signal module, equalization reservoir module, independent brake module and actuating module;
a module controller on each of said modules; and
said module controllers include an event log and stores data therein.

35. A control unit according to claim 34, wherein said module controllers stores data in said event log upon determining an event.

36. A control unit according to claim 35, including a unit controller; and wherein said module controllers send an event signal to said unit controller upon event determination.

37. A control unit according to claim 34, wherein said module controllers stores data in said event log upon predicting an event.

38. A control unit according to claim 34, including a unit controller; said unit controller and said module controllers each include a clock; and said unit controller periodically sends a time signal to said module controllers.

39. A modular locomotive brake control unit comprising:
a manifold having mounted thereon at least two of brake pipe module, brake cylinder module, brake signal module, equalization reservoir module, independent brake module and actuating module;
each of said modules includes a module controller having operating modes;
an electrical device connected to said module controller and having a status;
a unit controller connected to each of said module controllers for controlling the mode of said modules and overriding the status of the devices.

40. A control unit according to claim 39, wherein said module controllers ignore device overrides when in a normal mode and obey device overrides in a test mode.

41. A control unit according to claim 40, wherein said module controllers store an operating program, execute said operating program in the normal mode and not in said test mode, and obey device overrides and execute said operating program in a monitor mode.

42. A control unit according to claim 39, wherein said module controller has a normal mode and a test mode, and is in said normal mode in absence of a test mode command from said unit controller.

43. A control unit according to claim 39, wherein said module controllers store an operating program and said unit controller transfers operating programs to said module controllers.

44. A modular locomotive brake control unit comprising:
a manifold having brake pipe, brake cylinder, equalization reservoir, supply and independent brake ports;
a brake pipe module mounted on said manifold and controlling pressure at said brake pipe port;
a brake cylinder module mounted on said manifold and controlling pressure at said brake cylinder port;
an electropneumatic equalization reservoir module mounted on said manifold and controlling pressure at said equalization reservoir port;
an electropneumatic independent brake module mounted on said manifold and controlling pressure at said independent brake port;
an electropneumatic brake signal module mounted on said manifold and providing pneumatic brake signals to said brake cylinder module; and
at least each of said electropneumatic modules including electropneumatic and pneumatic elements and a module controller.

45. A control unit according to claim 44, wherein said module controllers have a common structure including:
a processor;
plural analog input ports connected to said processor;
plural digital input ports connected to said processor; and
plural digital output ports connected to said processor.

46. A control unit according to claim 45, wherein said processor include a closed loop pressure controller receiving inputs from said processor and one of said analog input ports and providing outputs on at least one of said digital output ports.

47. A control unit according to claim 45, wherein said common structure includes a power converter converting a DC input voltage at a first value to DC output voltage at a second value less than said first value.

48. A control unit according to claim 45, wherein said common structure includes a transceiver connecting said processor to other controllers.

49. A control unit according to claim 48, wherein said processor is a node connected in a network by said transceiver.

50. A control unit according to claim 44, wherein each of said module controllers include a storage having identification data stored therein.

51. A control unit according to claim 50, wherein said module controllers store event data in said storage.

52. A control unit according to claim 44, wherein said module controllers are connected in a communications network with each other.

53. A control unit according to claim 44, wherein said module controllers are connected with each other by a wiring harness.

54. A control unit according to claim 44, including a junction box on said manifold connecting said electropneumatic modules to an external source of electrical signals.

55. A control unit according to claim 44, including at least one pressure transducer on each electropneumatic module connected to said module controller.

56. A control unit according to claim 44, including two brake pipe pressure transducers, each on a separate module, connected to a module controller.

57. A control unit according to claim 56, including two supply pressure transducers, each on a separate module, connected to a module controller.

58. A control unit according to claim 44, wherein said brake pipe module includes at least one electropneumatic valve and a module controller.

59. A control unit according to claim 44, an electropneumatic actuating module mounted on said manifold and controlling pressure at an actuating port on said manifold; and said actuating module includes electropneumatic and pneumatic elements and a module controller.

* * * * *